United States Patent [19]

Wu et al.

[11] Patent Number: 5,575,418
[45] Date of Patent: Nov. 19, 1996

[54] CORRUGATED PAPERBOARD PACKAGE SYSTEMS WITH GAS-PERMEABLE PLASTIC MEMBRANES FOR MODIFIED ATMOSPHERE PACKAGING OF FRESH FRUITS AND VEGETABLES AND CUT FLOWERS

[75] Inventors: Chiu H. Wu, Vancouver, Canada; Juhani I. Oikarinen, Lahti, Finland; Bo Matstoms, Örebro, Sweden; William D. Powrie, North Vancouver, Canada

[73] Assignee: The University of British Columbia, Vancouver, Canada

[21] Appl. No.: 250,460

[22] Filed: May 27, 1994

[30] Foreign Application Priority Data

Sep. 30, 1993 [CA] Canada .................................. 2107456

[51] Int. Cl.⁶ ............................................. B65D 85/50
[52] U.S. Cl. ................. 229/3.5 R; 229/3.1; 229/170; 229/939; 428/182
[58] Field of Search ................................. 229/3.1, 3.5 R, 229/939, 120; 156/205, 210, 462; 428/34.2, 182; 426/118, 127, 385, 404

[56] References Cited

U.S. PATENT DOCUMENTS

| | | | |
|---|---|---|---|
| 3,308,006 | 3/1967 | Kresse et al. | 229/3.1 |
| 3,379,537 | 4/1968 | Brandt et al. | 426/127 |
| 3,399,819 | 9/1968 | Rennie et al. | 229/3.1 |
| 3,450,542 | 6/1969 | Badran . | |
| 3,450,544 | 6/1969 | Badran et al. . | |
| 3,630,759 | 12/1971 | Rumberger . | |
| 3,723,222 | 3/1973 | Kurita et al. | 156/210 |
| 3,798,333 | 3/1974 | Cummin et al. . | |
| 3,811,987 | 5/1974 | Wilkinson et al. | 156/210 |
| 4,358,498 | 11/1982 | Chavannes | 156/205 |
| 4,489,120 | 12/1984 | Hollinger, Jr. | 428/182 |
| 4,500,381 | 2/1985 | Nordstrom | 156/205 |
| 4,515,266 | 5/1985 | Myers | 229/120 |

FOREIGN PATENT DOCUMENTS

| | | | |
|---|---|---|---|
| 737763 | 7/1966 | Canada | 229/3.1 |
| 0332742 | 9/1989 | European Pat. Off. . | |
| 2104796 | 8/1972 | Germany | 229/939 |
| 14095 | 2/1978 | Japan | 428/182 |
| 4214336 | 8/1992 | Japan | 428/182 |
| 7101236 | 8/1972 | Netherlands . | |
| 1296040 | 11/1972 | United Kingdom . | |
| 1592880 | 7/1981 | United Kingdom . | |
| 2096052 | 10/1982 | United Kingdom . | |

OTHER PUBLICATIONS

R. G. Tomkins, "The Conditions Produced in Film Packages by Fresh Fruits and Vegetables and the Effect of These Conditions on Storage Life", *J. appl. Bact.*, 1962, 25 (2), 290–307.

C. A. Eaves, "A Modified–Atmosphere System for Packages of Stored Fruit", 1960, J. Hort. Sci., vol. 35, 110–117.

*Primary Examiner*—Gary E. Elkins
*Attorney, Agent, or Firm*—Oyen Wiggs Green & Mutala

[57] ABSTRACT

This invention relates to novel package systems for refrigerated modified atmosphere packaging of fresh fruit, vegetables and cut flowers. More particularly, this invention relates to the design, construction, closure, sealing and use of gas-permeable corrugated paperboard package systems for prolonging the storage life of fresh fruits, vegetables and cut flowers under modified atmosphere in the headspaces of the closed package system. A corrugated gas permeable paperboard comprising: (a) a first layer of Kraft paper; (b) a layer of polymer having a gas permeability which permits gas to be transmitted through the polymeric film at prescribed levels; (c) a second layer of Kraft paper, said first and second layers of Kraft paper sandwiching the polymer between them; (d) a corrugated fluting; and (e) a third layer of Kraft paper affixed to the corrugated fluting.

46 Claims, 12 Drawing Sheets

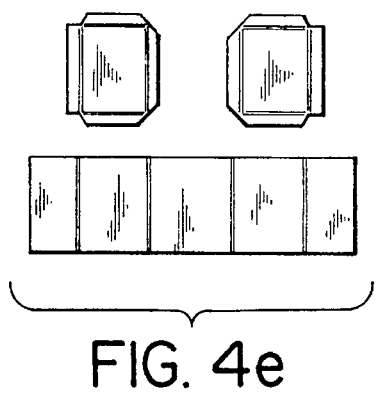
FIG. 4e
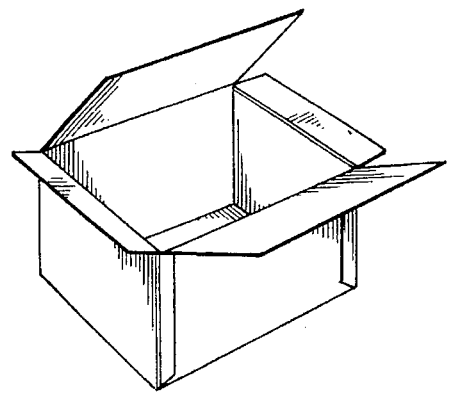
FIG. 4f
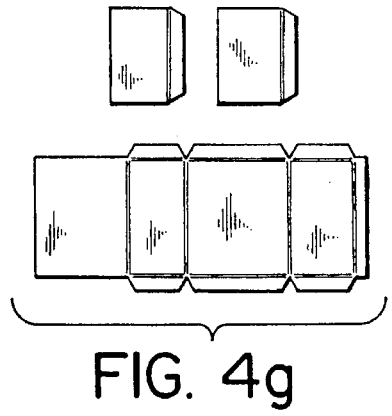
FIG. 4g
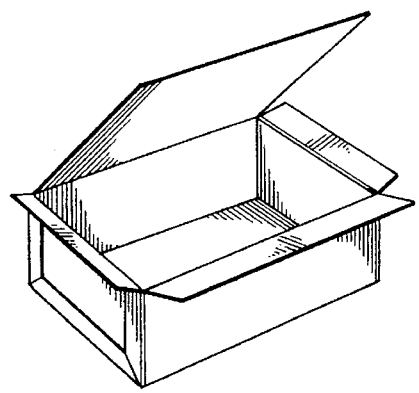
FIG. 4h
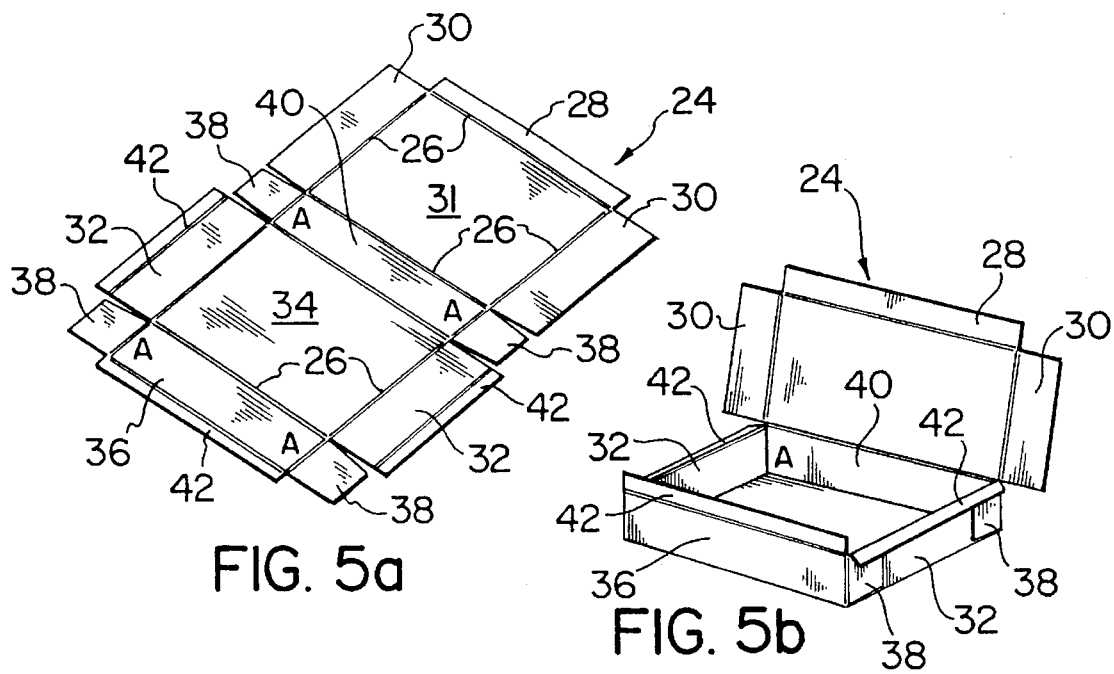
FIG. 5a
FIG. 5b

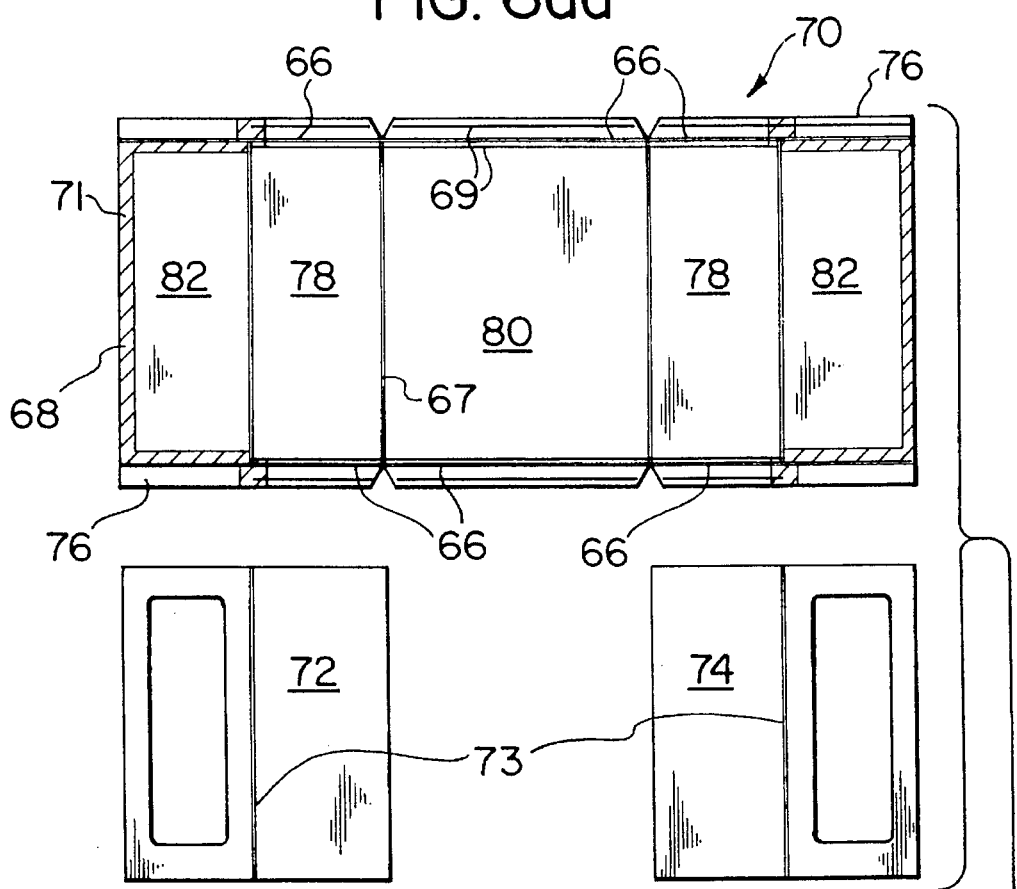
FIG. 6aa
FIG. 6a
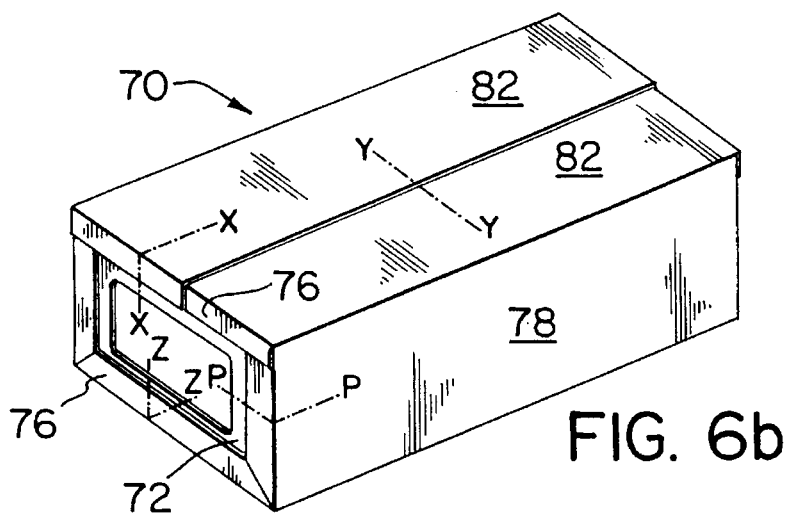
FIG. 6b

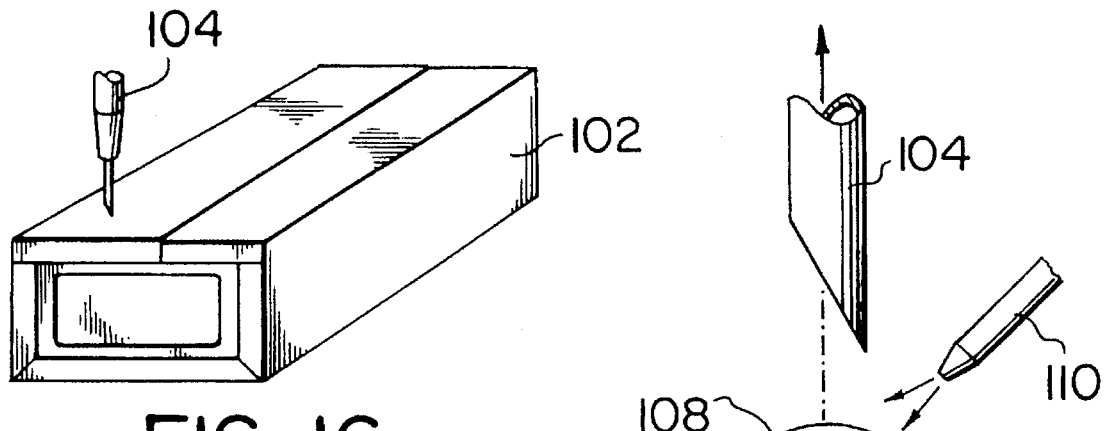
FIG. 16
FIG. 18
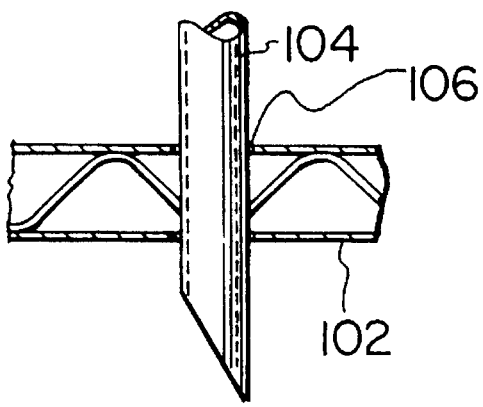
FIG. 17
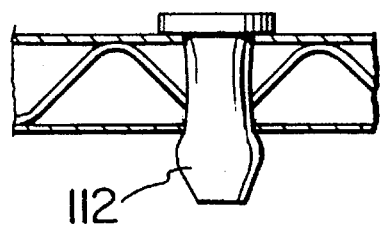
FIG. 19

CORRUGATED PAPERBOARD PACKAGE SYSTEMS WITH GAS-PERMEABLE PLASTIC MEMBRANES FOR MODIFIED ATMOSPHERE PACKAGING OF FRESH FRUITS AND VEGETABLES AND CUT FLOWERS

FIELD OF THE INVENTION

This invention relates to novel package systems for modified atmosphere packaging of fresh fruit, vegetables and cut flowers. More particularly, this invention relates to the design, construction, closure, sealing and use of corrugated paperboard package systems with gas-permeable plastic membranes for prolonging the storage life of fresh fruits, vegetables and cut flowers under modified atmosphere in the headspaces of the closed package system.

BACKGROUND OF THE INVENTION

The quality attributes of fresh fruits, vegetables and cut flowers must be maintained as much as possible for as long as possible to ensure consumer acceptability. Quality deterioration of horticultural produce comes about through plant tissue enzyme reactions including respiration, ripening and senescence, through microbial growth and through water loss for the tissue. Methods of inhibiting the deteriorative enzyme reactions, and the growth of yeasts, molds and bacteria involve the reduction of the produce temperature to between 1° and 12° C., and the creation of low $O_2$/high $CO_2$ modified atmosphere (MA) around the produce. Water in fruits and vegetables can be lost readily under low relative humidity conditions with the consequence of skin wrinkling, wilting and reduction in crispness. The rate of water loss from produce can be restricted by storing the produce in closed package systems consisting of walls with low moisture permeability.

Modified atmosphere packaging (MAP) of fruits and vegetables is a process involving:
1. Pre-packaging conditions and treatment of produce;
2. The packing of produce into a gas-permeable package system;
3. The introduction of predetermined $CO_2$ and $O_2$ containing gas mixture flush into the headspace of the package system or the retention of existing air in the head-space of the package system; and
4. Closure and sealing of the MA package system.

During storage, the fruits and vegetables convert $O_2$ from the headspace to $CO_2$ through the respiration process with the result that the $O_2$ content in the headspace decreases while the $CO_2$ content increases. The objective in the design of an effective package system for MAP of produce is to regulate the influx of $O_2$ to an efflux of $CO_2$ from the package headspace to achieve and maintain a suitable equilibrium modified atmosphere in the headspace around the stored produce for optimum retention of the quality attributes and for the reduction of microbial growth.

Low $O_2$ levels and elevated $CO_2$ levels in the headspace around a horticultural commodity reduce the respiration and ripening rates, and the growth of spoilage organisms (spoilogens). Unsuitable modified atmospheres around produce in a package system can induce physiological damage, prevent wound healing, enhance senescence and cause off-flavour formation. $O_2$ levels lower than 1% bring about anaerobic respiration and off-flavour development, whereas $CO_2$ levels of about 10% or higher inhibit spoilogen growth but may cause tissue damage to $CO_2$-sensitive commodities.

Package systems for MAP must be designed and constructed with specific packaging materials to meet the following requirements:
1. Maintain definitive beneficial equilibrium levels of $CO_2$ and $O_2$ in the headspace;
2. Obviate gas pressure build-up within a package system;
3. Minimize moisture loss from produce;
4. Prevent produce crushing and bruising; and
5. Inhibit water migration from the package interior into the walls of the package system for the purpose of retaining structural strength of the walls.

The gas and moisture permeabilities of package components of MA package systems are critical parameters. The technology of plastic polymeric films has advanced to such an extent that a specific gas permeability requirement can be met with a single plastic film or a multifilm combination, with or without vent pinholes.

In 1960, Eaves (J. Hort. Sci. 37:110, 1960) reported the effectiveness of gas-permeable, flexible polymeric barrier film as a package system for extending the life of fresh commodities. Tomkins (J. Appl. Bacteriol. 25:290, 1962) used polymeric film-covered trays as package systems to determine their effectiveness in establishing equilibrium MA around apples. Prior art on the use of bags made from polymeric plastic, gas permeable film such as polyethylene and polyvinylchloride, for prolonging of shelf-life of stored fruits and vegetables, is exemplified by U.S. Pat. No. 3,450,542, Badran, U.S. Pat. No. 3,450,544, Badran et al., and U.S. Pat. No. 3,798,333, Cummin. A more complex package system has been described by Rumberger (U.S. Pat. No. 3,630,759) in that an inner plastic pouch containing the produce is enveloped by an outer pouch containing an atmosphere of less than 15% $O_2$. Both pouches are to be constructed from gas-permeable films.

Corrugated paperboard boxes and cartons are used commercially for the storage and transport of fresh horticultural commodities. The advantages of the corrugated paperboard boxes and cartons are the relatively low cost per unit volume, low thermal energy conductivity, impact absorbing ability to prevent bruising of commodities and ease of disposal at the receiving end.

However, conventional corrugated paperboard has a very high gas and moisture permeability and as such is unsuitable for modified atmosphere packaging of horticultural commodities.

SUMMARY OF THE INVENTION

The invention is directed to a corrugated gas permeable paperboard comprising: (a) a first layer of Kraft paper; (b) a layer of polymer; (c) a second layer of Kraft paper, said first and second layers of Kraft paper sandwiching the polymer between them; (d) a corrugated fluting affixed to a side of the second Kraft paper layer, opposite the polymer and the first layer of Kraft paper; and (e) a third layer of Kraft paper affixed to the corrugated fluting, on a side of the fluting opposite the second layer of Kraft paper said paperboard having a having a gas permeability which permits gas to be transmitted through the paperboard at prescribed levels.

The gas permeability of the polymer or paperboard can be between about 50 and 50,000 $cc^3/m^2 \cdot 24$ hr. 1 atm. The first layer of Kraft paper, the layer of polymer and the second layer of Kraft paper can be formed together before the fluting and third layer of Kraft paper are joined together, to form the paperboard.

The layer of polymer can be extruded on one side of the first layer of Kraft paper and then affixed to the second layer of Kraft paper. The layer of polymer and the second layer of Kraft paper are affixed to the corrugated fluting. The layer of polymer can be preformed and then laminated between the first layer of Kraft paper and the second layer of Kraft paper, and the first layer of Kraft paper the layer of polymer and the second layer of Kraft paper can be affixed to the corrugated fluting.

The layer of polymer or coating can be low density polyethylene or high density polyethylene, or a copolymer of low density polyethylene and ethylenebutyl-acetate, or other polymers.

The permeability of the paperboard can be regulated by regulating the amount and composition of the polymer, or by regulating the rate of extrusion of the polymer in forming the layer of polymer.

The invention is also directed to a corrugated paperboard modified atmosphere package container suitable for packaging fruits, vegetables and cut flowers under refrigerated modified atmosphere conditions comprising: (a) a corrugated paperboard blank having flaps, side panels, end panels, base panels and lid panels formed therein and fold and joint lines impressed therein, and being adapted to be erected into a box or carton, said corrugated paperboard blank being constructed of: (i) a first layer of Kraft paper; (ii) a layer of polymer having a gas permeability which permits gas to be transmitted in either direction through the polymer at prescribed levels; (iii) a second layer of Kraft paper, said first and second layers of Kraft paper sandwiching the polymer between them; (iv) a corrugated fluting affixed to a side of the second Kraft paper layer, opposite the polymer and the first layer of Kraft paper; (v) a third layer of Kraft paper affixed to the corrugated fluting layer, on a side of the fluting opposite the second layer of Kraft paper; and (b) glue applied to intersecting joints, flaps, side panels, end panels, and lid panels to provide a hermetic seal to the erected carton or box, said container having a required overall permeability which permits gas to be transmitted into or out of the container. The overall permeability can be selected to accord with the respiration rate and the characteristics of the fresh produce that is to be packaged in the container.

The glue can be a hot melt resin formulation or cold set water resistant glue which is applied to cover exposed and intersecting edges of the joints, flaps, side panels, end panels and lid panels. The glue can also be a foamed glue which is applied to cover exposed and intersecting edges of the joints, flaps, side panels, end panels and lid panels.

At least one porthole of the container can be punched in an end panel of the container, and subsequently sealed with a plug, or subsequently sealed with tape. At least some edges of the joints, flaps and panels can be sealed with tape. At least some of the joints, flaps and panels can be sealed with glue and tape. A first side of the first layer of Kraft paper, opposite the side adjacent the polymer layer, can be coated with a polymeric coating.

Edges of flaps intersecting with sides of the container can be sealed with glue, and the flaps can be bent around the corners of the glued edges, and glued at a second location. Exposed edges of flaps and sides can be folded, and the exposed edges of the corrugated paperboard can be sealed with glue. Glue can be applied at a second location to exposed edges of paperboard.

After the container is erected, and sealed, the interior of the container can be filled with a modified gas atmosphere which is injected into the interior of the container by a gas injection nozzle which penetrates a wall of the container. A puncture can be formed in the wall of the container by the gas injection nozzle and the puncture can be sealed with glue or with a plug, after extraction of the nozzle.

The layer of polymer can be selected so that it has a gas permeability which is within a predetermined gas transmission range which is selected in accordance with the proportion of gas components which are injected into the interior of the container. At least one of the layers of the container can be punctured with at least one pinhole to regulate gas transmission rates through container walls. The pinhole can penetrate at least two layers of the corrugated paperboard. A pinhole can penetrate the layer of polymer.

The layer of polymer can be flexible and can have selected gas and moisture permeabilities. The layer of polymer can be at least partially permeable to oxygen and carbon dioxide. The gas permeability of the polymer or coated paperboard can be between about 50 and 50,000 $cc^3/m^2.24$ hr. 1 atm. The polymer can be selected from the group consisting of ethylene vinylacetate (EVA), ethylbutyl acetate (EBA), a cross-linked ionomer resin, cast polyester (PET), a polyamide and polycarbonate (PC).

The container can be filled with produce, a modified atmosphere can be injected into the container, and the container can be held at a temperature between about 1° C. to 12° C.

The paperboard can have double parallel fluting separated by a layer of Kraft paper. The polymer layer can be associated with the fluting and can be adjoined to the third layer.

DRAWINGS

In drawings which illustrate specific embodiments of the invention, but which should not be construed as restricting the spirit or scope of the invention in any way:

FIG. 4e illustrates a plan view of three blanks used to construct a conventional Bliss box, International Code 0605.

FIG. 4f illustrates an isometric view of the three blanks illustrated in FIG. 4e formed to construct a Bliss box, International Code 0605.

FIG. 4g illustrates a plan view of the three blanks illustrated in FIG. 4e formed to construct a Bliss box, International Code 0601.

FIG. 4h illustrates an isometric view of the three blanks illustrated in FIG. 4g formed to construct a Bliss box, International Code 0601.

FIG. 5a illustates an isometric view of a corrugated container blank used to construct a single piece wrap-around tray style MAP container according to the invention.

FIG. 5b illustrates an isometric view of a corrugated container blank of FIG. 5a folded into a single piece wrap-around tray style MAP container.

Figure 5C:
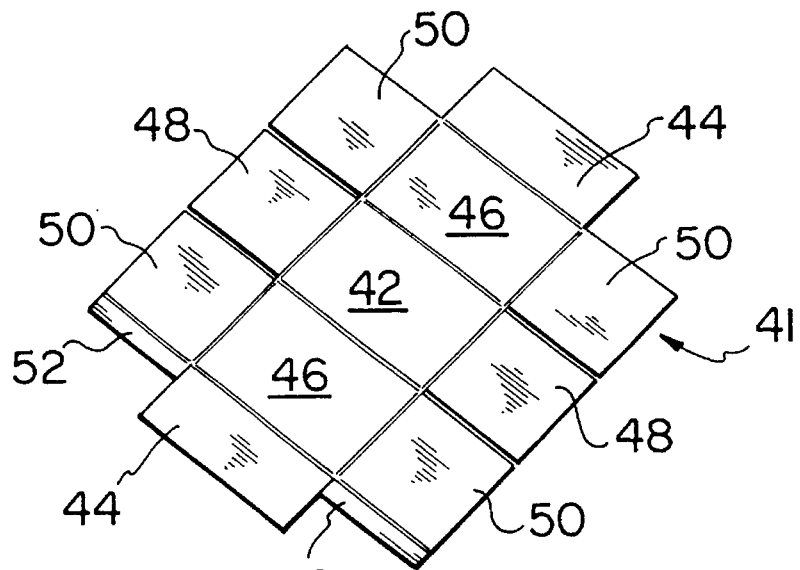

FIG. 5c illustrates an isometric view of one possible corrugated container blank used to construct a single piece wrap-around (deep) MAP container.

Figure 5D:
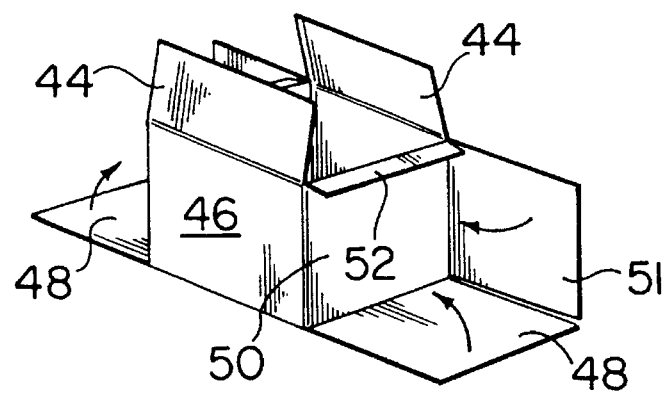

FIG. 5d illustrates the method of folding the blank of FIG. 5c into a wrap-around deep MAP container.

Figure 5E:
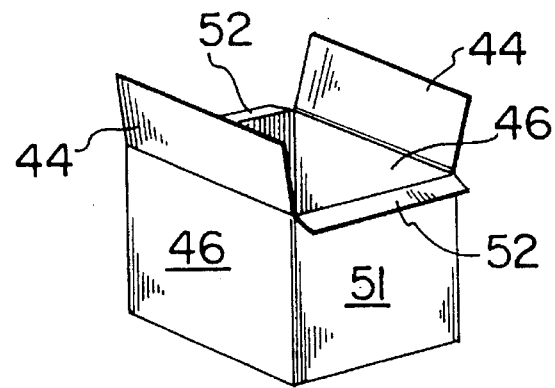

FIG. 5e illustrates an isometric view of an erected single piece wrap-around deep style MAP container with two overlapping open lids.

Figure 5F:
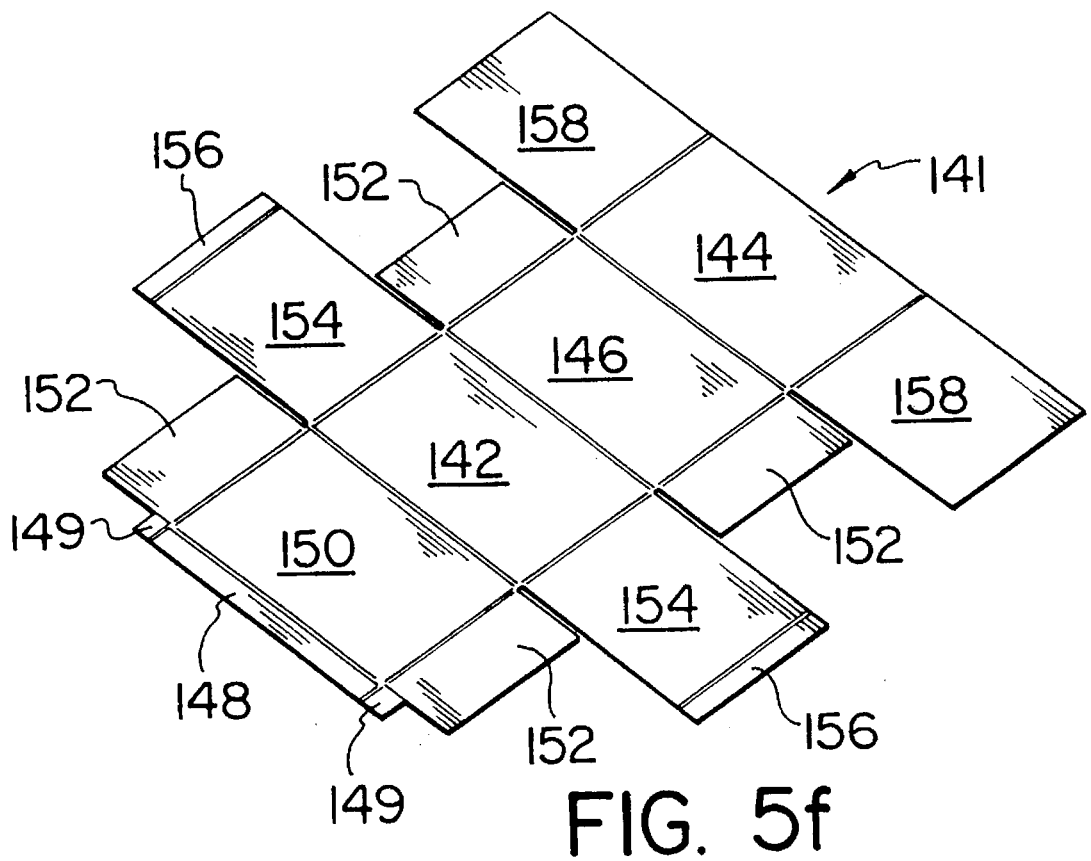

FIG. 5f illustrates an isometric view of an alternative blank design used to construct a single piece wrap-around (deep) MAP container.

Figure 5G:
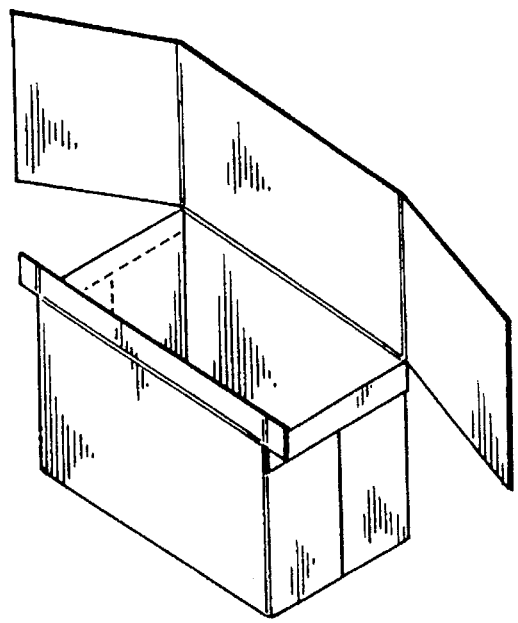

FIG. 5g illustrates an isometric view of the erected alternative design wrap-around deep style MAP container.

FIG. 6a illustrates a plan view of the paperboard blanks of a three-piece Bliss style MAP container.

FIG. 6aa illustrates an enlarged view of a fold section of the blanks of FIG. 6a.

FIG. 6b illustrates an isometric view of the three components of FIG. 6a folded into an erect three-piece Bliss style MAP container.

Figure 6C:
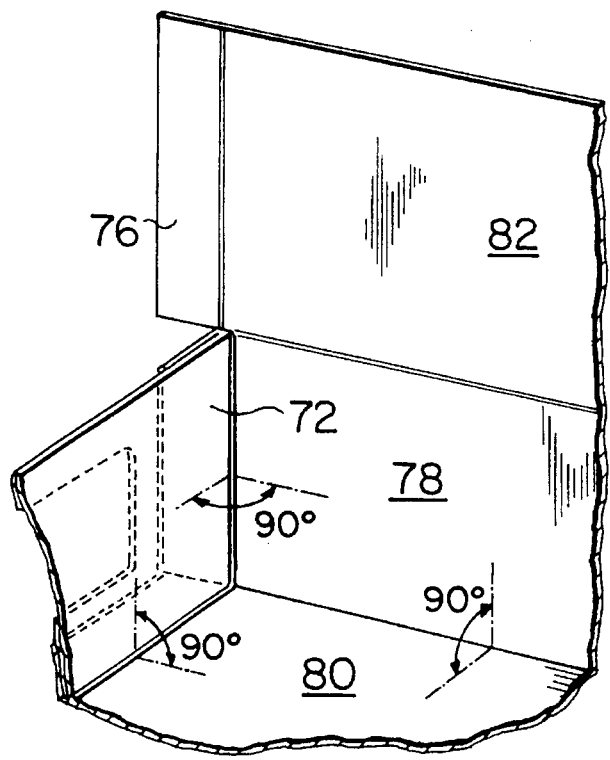

FIG. 6c illustrates an isometric interior cut-away view of a corner joint construction of a Bliss style MAP container.

Figure 6D:
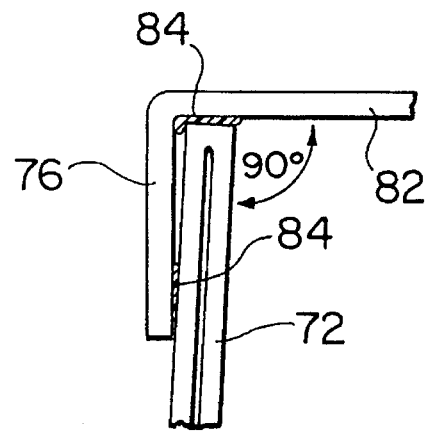

FIG. 6d illustrates a section view taken along section line X—X of FIG. 6b.

Figure 6E:
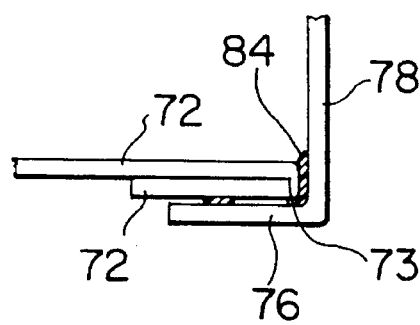

FIG. 6e illustrates a section view taken along section line p—p of FIG. 6b.

Figure 6F:
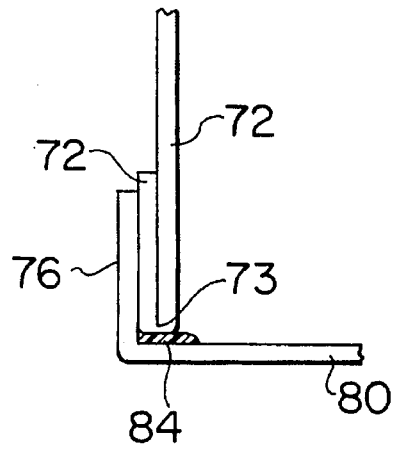

FIG. 6f illustrates a section view taken along section line 2—2 of FIG. 6b.

Figure 6G:
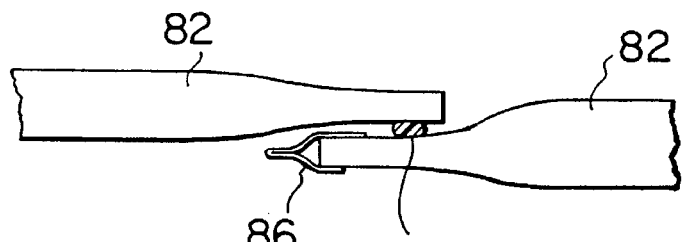

FIG. 6g illustrates a section view taken along section line Y—Y of FIG. 6b.

Figure 6H:
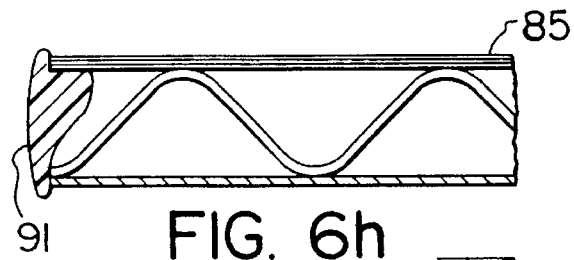
Figure 6I:
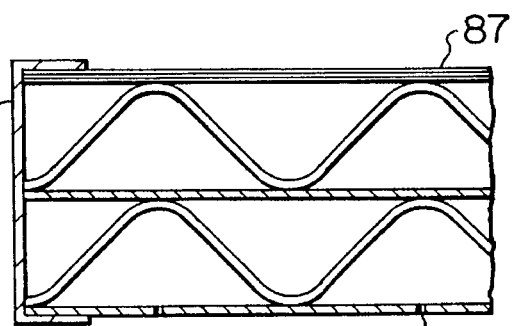
Figure 6J:
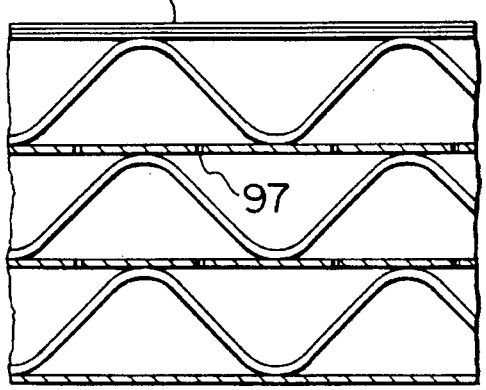

FIGS. 6h, 6i and 6j illustrate respectively side section views of single wall corrugated, double wall corrugated and triple wall corrugated paperboard.

Figure 7:
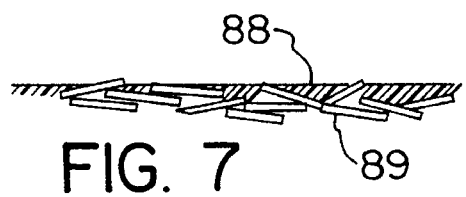

FIG. 7 illustrates an enlarged end view of a section of paperboard with protruding cellulose fibres on the side partially coated with a polymer.

Figure 8:

FIG. 8 illustrates an enlarged view of a section of paperboard with cellulose fibres on one side completely coated with polymer.

Figure 9:
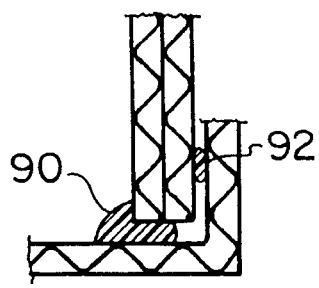

FIG. 9 illustrates an end section view of a corner construction of a MAP container sealed at two locations with hot melt glue.

Figure 10:
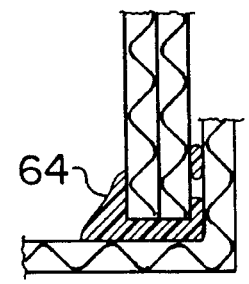

FIG. 10 illustrates an end section view of a corner construction of a MAP container sealed at two locations with foamed glue.

Figure 11:
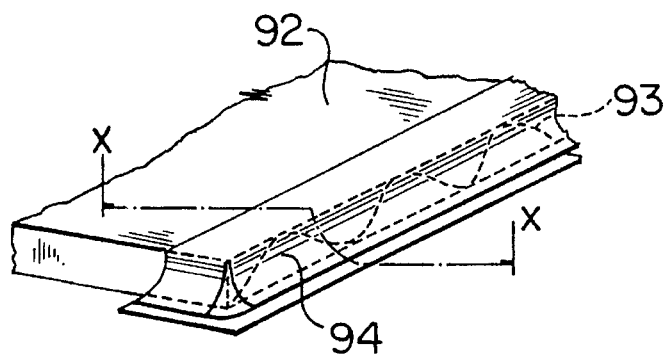

FIG. 11 illustrates a partial isometric view of the edge of a trilayer corrugated paperboard sealed with hot melt glue and double tape.

Figure 12:
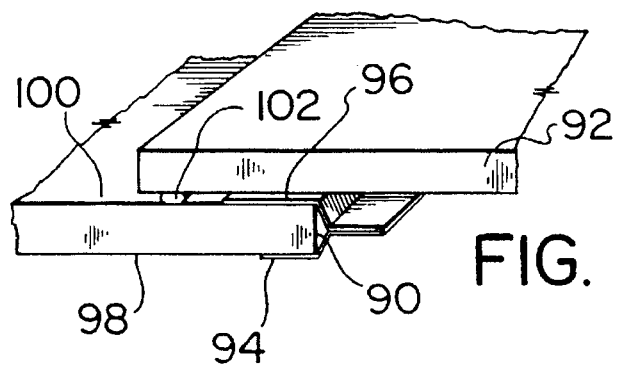

FIG. 12 illustrates a section view taken along section line X—X of FIG. 11.

Figure 13:
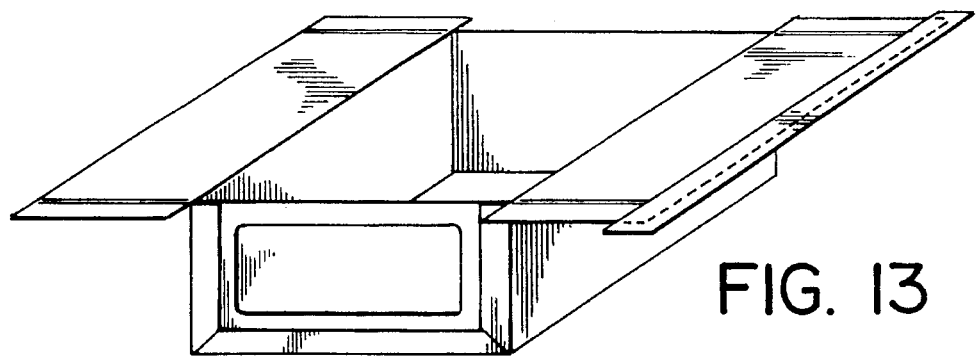

FIG. 13 illustrates an isometric view of a MAP container with the top lid flaps sealed with tape prior to closing.

Figure 14:
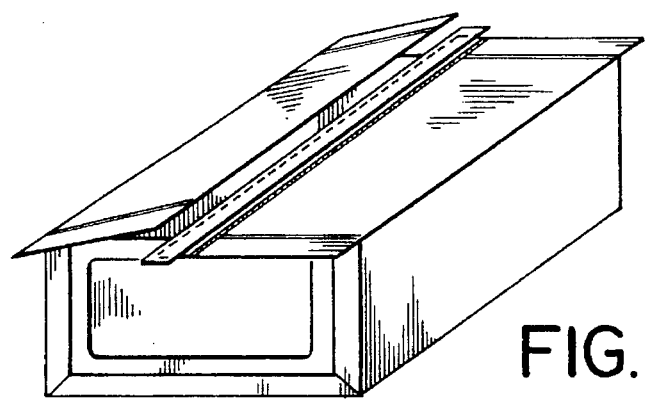

FIG. 14 illustrates an isometric view of a MAP container with the top end flaps sealed with glue prior to closing.

Figure 15:
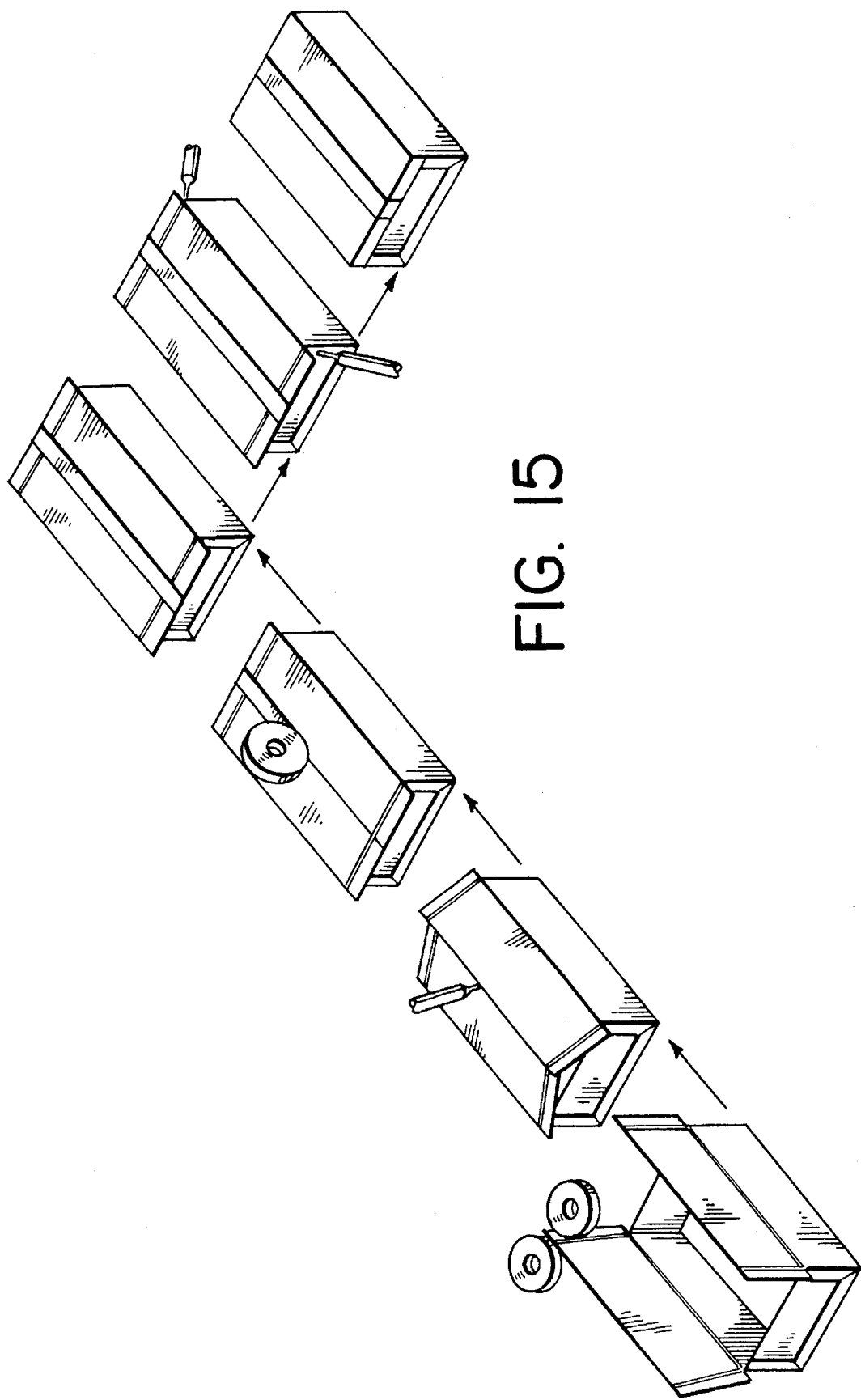

FIG. 15 illustrates an isometric sequential view of a MAP container as it proceeds through a tape, glue, tape, glue and compression procedure.

FIG. 16 illustrates an isometric view of a MAP container being punctured with a MAP gas injector nozzle.

FIG. 17 illustrates a side section view of a MAP gas injector nozzle penetrating a trilayer container wall.

FIG. 18 illustrates a side section view of MAP gas injector nozzle withdrawn from a trilayer wall and the injector hole being sealed by a glue jet.

FIG. 19 illustrates a side section view of an injector hole in a trilayer paperboard sealed with a plug.

DETAILED DESCRIPTION OF SPECIFIC EMBODIMENTS OF THE INVENTION

Figure 1A:
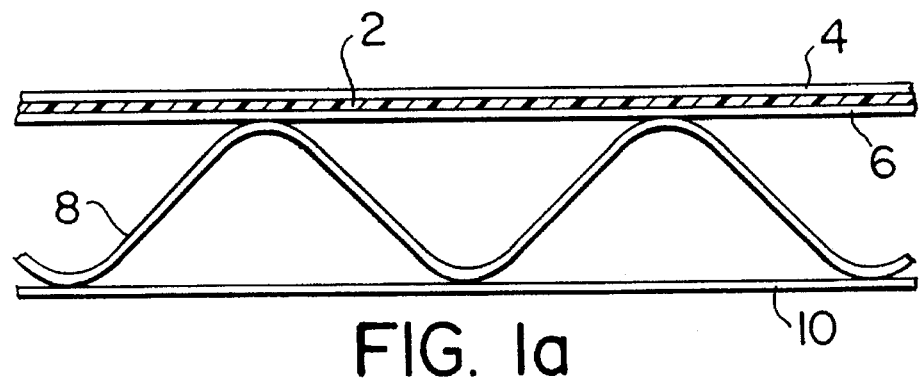
FIG. 1a illustrates a side section view of a corrugated MAP paperboard with a polymer layer sandwiched between two layers of Kraft paper on one side, a corrugated flute and a Kraft paper outer wall.

This invention pertains to the design, construction, closure, sealing and use of novel corrugated paperboard package systems (e.g. boxes, cartons) formulated to include plastic coating or film of selected gas permeability as part of the wall structure for prolonging the storage life of fresh fruits and vegetables under modified atmosphere (MA) in the headspaces of the closed package systems. FIG. 1a illustrates a side section view of a corrugated paperboard MAP construction with a polymeric gas permeable film sandwiched between two layers of Kraft paper on one side, a corrugated flute structure and a Kraft paper outer wall. As shown in FIG. 1a, the invention is concerned in one aspect with the placement of selected types of gas-permeable plastic films 2 or plastic coatings 2 (as membranes) between two sheets of Kraft paper 4 and 6 to form a trilayer complex which is glued to one side of fluting 8 which has a Kraft paper outer wall 10 on the opposite side. When used in the construction of a MAP box or carton, the film or polymer coating 2 and the inner wall 4 are placed facing inwardly to act as the inner liner of the corrugated paperboard MAP container.

Figure 1B:
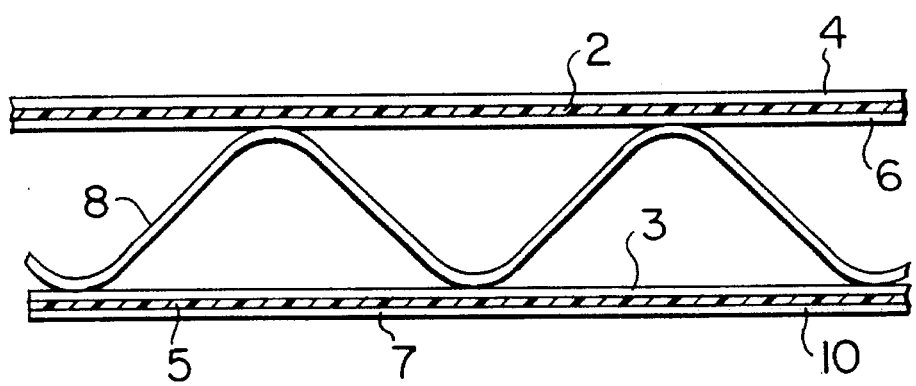
FIG. 1b illustrates a side section view of a corrugated MAP paperboard with a Kraft layer of paper, a corrugated flute and a polymer layer sandwiched between two layers of Kraft paper on the other side.
Figure 1C:
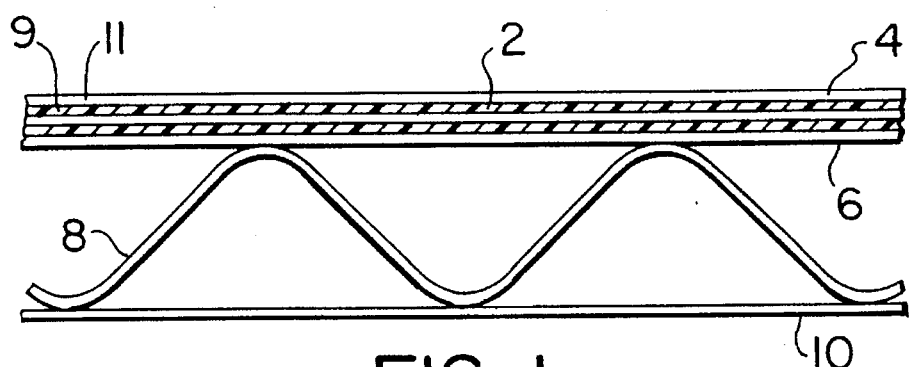
FIG. 1c illustrates a side section view of a corrugated MAP paperboard with two polymer layers sandwiched respectively between three alternating layers of Kraft paper on one side, a corrugated flute and a Kraft paper outer wall.
Figure 1D:
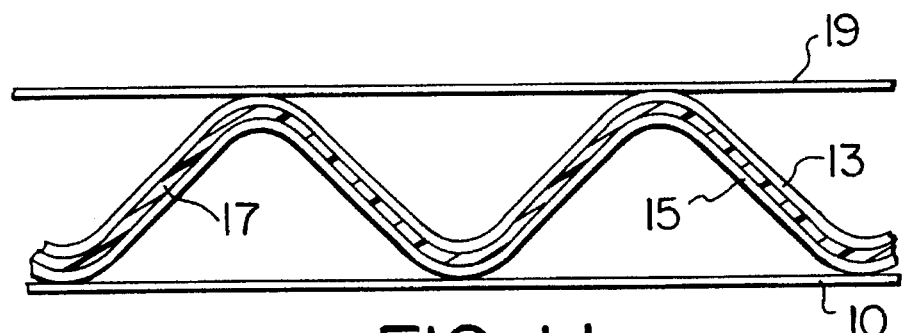
FIG. 1d illustrates a side section view of a corrugated MAP paperboard with a layer of Kraft paper on one side, a corrugated fluting of two Kraft paper layers with an intermediate polymer layer, and a layer of Kraft paper on the other side.

FIG. 1b illustrates a side section view of a corrugated MAP paperboard with a Kraft layer of paper, a corrugated flute and a polymer layer sandwiched between two layers of Kraft paper on the other side. FIG. 1c illustrates a side section view of a corrugated MAP paperboard with two polymer layers sandwiched respectively between three alternating layers of Kraft paper on one side, a corrugated flute and a Kraft paper outer wall. FIG. 1d illustrates a side section view of a corrugated MAP paperboard with a layer of Kraft paper on one side, a corrugated fluting of two Kraft paper layers with an intermediate polymer layer, and a layer of Kraft paper on the other side.

Figure 2:
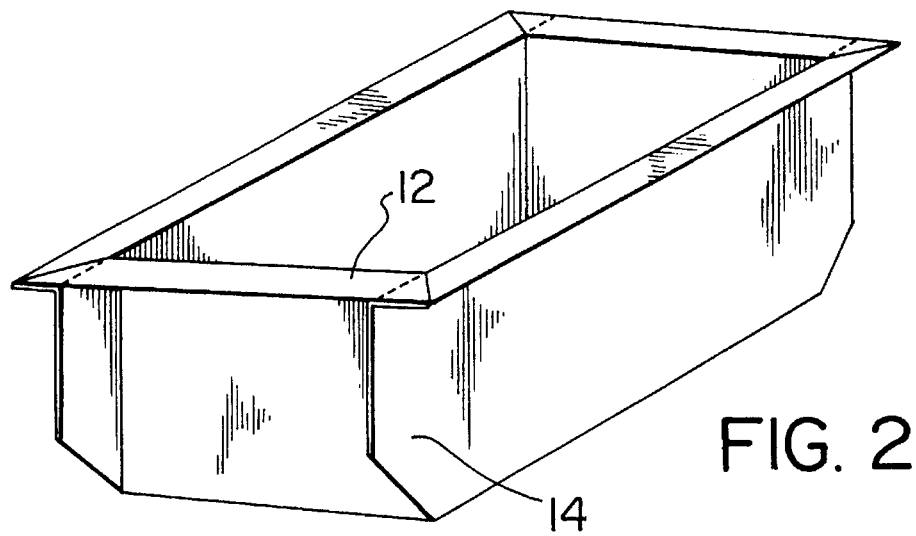
FIG. 2 illustrates an isometric view of one embodiment of MAP container formed from one piece blank of corrugated cardboard with end air spaces.
Figure 3A:
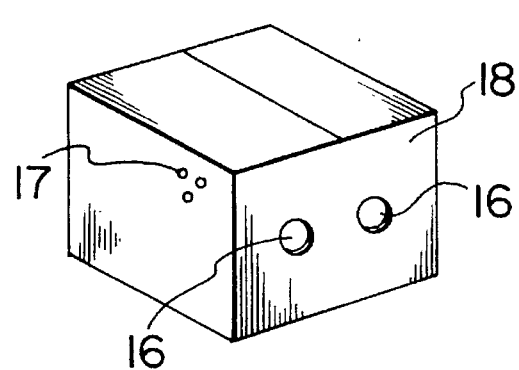
FIG. 3a illustrates an isometric view of a second embodiment of MAP container with ports in the end.
Figure 3B:
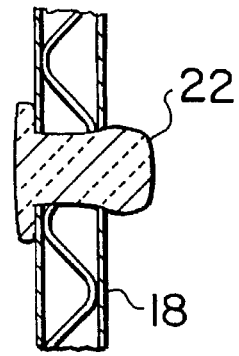
FIG. 3b illustrates an end section view of a MAP container wall with a plug through the port.
Figure 3C:
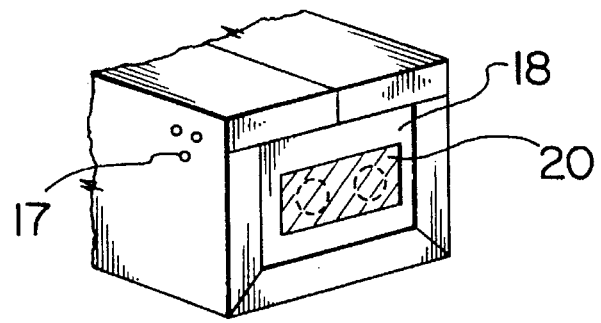
FIG. 3c illustrates an isometric view of a MAP container with folded ends, ports and a tape over the ports.

The invention also relates to the design of die-cut patterns of the novel plastic containing corrugated paperboard for the purpose of rendering the folded, sealed MA package airtight (with no air holes) and stackable. The folded, sealed MA package systems may possess external corrugated paperboard spacers (on the ends, or sides, or both) to create air spaces to enhance internal/external gas exchange. FIG. 2 illustrates an isometric view of one embodiment of MAP container formed from one piece blank of corrugated paperboard with end air spaces. The folded, sealed MA package systems containing produce, in another aspect, may possess holes or ports 16 in the end panels 18 as air inflow and outflow ports. See FIG. 3a which illustrates an isometric view of a second embodiment of MAP container with ports in the end. Such ports 16 may be used to blow cold air over warm produce in the container, or vacuum cooling, to reduce the produce temperature to an appropriate level and/or blow in a specific MA gas mixture. Thereafter, the ports 16 are covered with high gas barrier tape 20 (see FIG. 3c which illustrates an isometric view of a MAP container with folded ends, ports and a tape over the ports), or filled with high gas barrier or gas-permeable styrofoam plugs 22 (see FIG. 3b, which 3b illustrates an end section view of a MAP container wall with a plug through the port), or plugs with vent pinholes for increased influx/efflux of MA gases. The MAP containers may also be vacuum cooled, ie. placed in a vacuum cooled enclosed room. Alternatively, the walls or top or ends of the container can have one or more pinholes 17 to permit gas permeability at controlled rates.

A principal aim of the present invention is to provide reliable corrugated paperboard package systems which are suitable for modified atmosphere packaging (MAP) of fruits and vegetables. Two novel box styles of a single-piece type MA package system and one novel box style of a three-piece type MA package system have been invented.

Figure 4A:
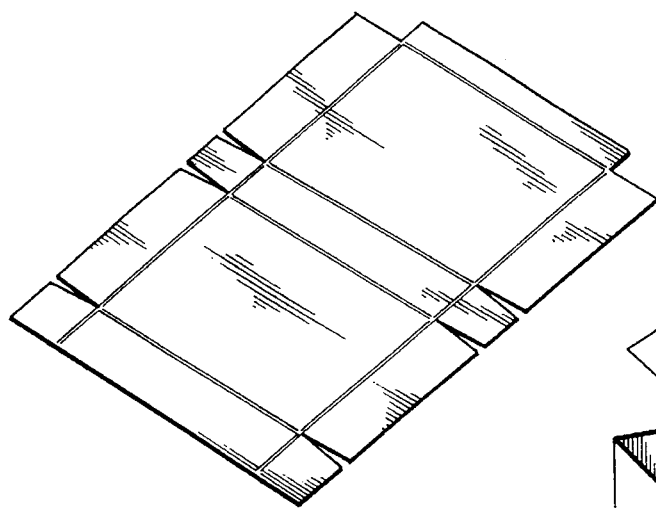
FIG. 4a illustrates an isometric view of a conventional unfolded blank used to construct a single piece tray style box container.
Figure 4B:
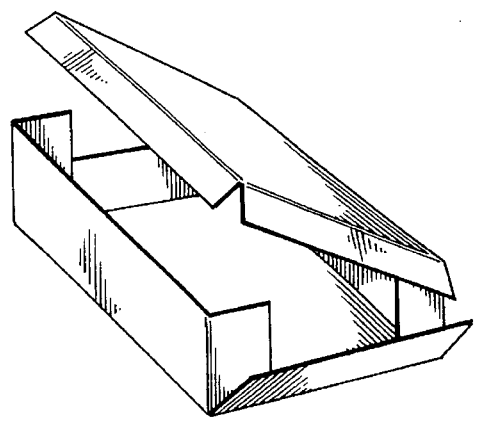
FIG. 4b illustrates an isometric view of the container blank of FIG. 4a folded to form a single piece tray style box container.
Figure 4C:
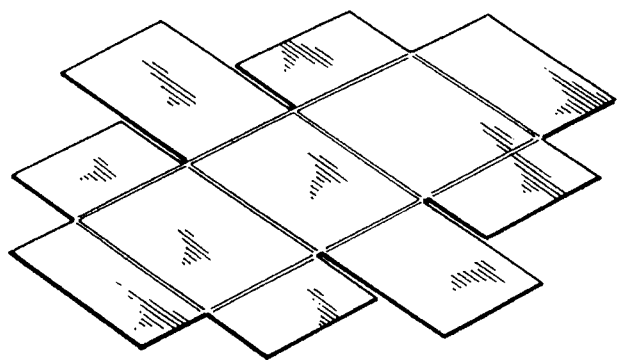
FIG. 4c illustrates an isometric view of a conventional blank used to construct a single piece wrap-around (deep) box container.
Figure 4D:
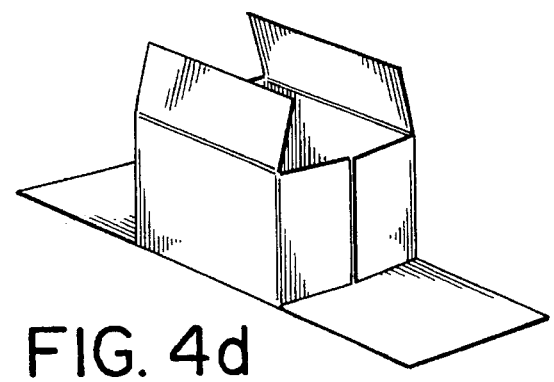
FIG. 4d illustrates an isometric view of the container blank of FIG. 4c folded to form a wrap-around deep box.

FIG. 4a illustrates an isometric view of a conventional unfolded blank used to construct a single piece tray style box container. FIG. 4b illustrates an isometric view of the container blank of FIG. 4a folded to form a single piece tray style box container. FIG. 4c illustrates an isometric view of a conventional blank used to construct a single piece wrap-around (deep) box container. FIG. 4d illustrates an isometric view of the container blank of FIG. 4c folded to form a wrap-around deep box. FIG. 4e illustrates a plan view of three blanks used to construct a conventional Bliss box, International Code 0605. FIG. 4f illustrates an isometric view of the three blanks illustrated in FIG. 4e formed to construct a Bliss box, International Code 0605. FIG. 4g illustrates a plan view of the three blanks illustrated in FIG. 4e formed to construct a Bliss box, International Code 0601. FIG. 4h illustrates an isometric view of the three blanks illustrated in FIG. 4g formed to construct a Bliss box, International Code 0601.

The conventional tray box style and wrap around box styles as shown in FIGS. 4a and 4b, and 4c and 4d, are single-piece type MA package systems whereas the Bliss boxes style as shown in FIGS. 4e and 4f, and 4g and 4h, are three-piece type MA package systems.

These conventional box styles are not usually airtight or gas permeability controlled. The designs of these conventional single-piece wrap-around boxes (tray style and deep style) and the conventional three-piece Bliss style boxes have been modified so that the sealed, closed boxes are airtight and thus can be used for modified atmosphere packaging of fresh fruits and vegetables. These design-modified boxes have been called Tamfresh™ MA package systems.

FIG. 5a illustrates an isometric view of a corrugated paperboard blank used to construct a single piece wrap-around tray style MAP container according to the invention.

FIG. 5b illustrates an isometric view of a corrugated paperboard blank of FIG. 5a partially folded into a single piece wrap-around tray style MAP container.

The design modification of the conventional single-piece wrap-around tray style box as seen in FIGS. 5a and 5b is the inclusion of a foldover flap on top of each of the three side panels attached to the base. When these glued flaps are folded onto the outer surfaces of the side panels, smooth top edges with no exposed flute are created. With no exposure of flute, gas leakage into or out of the sealed, closed Tamfresh package system is obviated.

Specifically, in accordance with this invention, a single-piece Tamfresh MA tray style package system is comprised of a die-cut corrugated paperboard body with a trilayer paperboard complex (see FIGS. 1a, 1b, 1c or 1d) as the inner liner to form a body 24 which is folded at a plurality of fold lines 26 and then glued with hot-melt resin glue, and finally compressed at the appropriate glued areas to construct an open-lid folded Tamfresh MA package system (box or carton) (see FIG. 5b). As such, the open, folded MA tray style package system has one lid and flaps at the top of the side panels. Upon filling the package cavity with produce, the lid is closed and sealed with hot-melt resin glue. The closed, folded, glue-sealed single-piece Tamfresh MA tray package system has the features of specific gas and moisture permeabilities, airtightness (no air holes) and stackability. Holes as gas input and gas output ports 16 (see FIGS. 3a, 3b and 3c) may be present in the end panels of the folded package systems for the purpose of blowing cold air through warm produce to reduce the produce temperature to an appropriate level and/or blow in a specific MA gas mixture. The ports 16 can be filled with either high gas-barrier plugs 22 or a gas-permeable styrofoam plug or plugs with vent pinholes or covered with high gas-barrier tape.

Specifically, in detail, the tray-style MA box shown in FIGS. 5a and 5b of the single-piece Tamfresh MA tray style package system consists of a die-cut body 24 with flaps 28 and 30 adjoined to the front and ends of the single lid 31, side panels 32 adjoined to the box base 34 and a front side panel 36 adjoined to the base 34. Fold-around end flaps 38 are respectively adjoined to the side panel 36 and interior side panel 40. Fold-over flaps 42 are adjoined to the two end panels 32 and side panel 36. FIG. 5b illustrates an isometric view of a cardboard blank of FIG. 5a folded into a single piece wrap-around tray style MAP container. The tray style MA box in the open form (as seen in FIG. 5b) is produced by applying hot-melt resin glue at specific locations (not shown), folding the body at the plurality of fold lines 26 and compressing at the glued flap locations 42 (see FIG. 5b). The folded down flaps 42 ensure that there are no exposed tri-layer paperboard edges or fluting around the top edges of the box base 34 with sides 32 and 36. After filling the box cavity with produce, the lid 31 is lowered into place with the glued front 28 and side flaps 30 overlapping on the bottom side panel 36 and end panels 32, respectively.

After compressing the flaps, the box is sealed completely. This design of the tray-style Tamfresh MA box eliminates the presence of exposed flute ends (see FIG. 1) in the interior space of the sealed box thereby providing the required advantage of airtightness. In particular, the design calls for ribbons or beads of hot-melt resin glue to be applied along the fold lines 26 of flaps 38 adjoining the two-side panels. Upon folding the side panels upward to the perpendicular position to meet the end panels, the ribbons of hot-melt resin glue on the fold lines come in contact with the exposed flute edges of the end panels to bring about flute closure or sealing. In this way, the box can be assured to be sealed and the modified atmosphere in the box controlled.

One design variant of the wrap-around (deep) style MA box (see FIGS. 5c, 5d and 5e) of the single-piece type MA package system consists of a die-cut body 41 with a base 42, a pair of overlapping lids 44, a pair of side panels 46, two fold-over base end panels 48 adjoined to the base 42, and four foldover end panels 50 adjoined to the respective side panels 46. Two foldover flaps 52 adjoin the top sides of two of the end panels 50.

FIG. 5d illustrates the method of folding the blank of FIG. 5c into a wrap-around deep MAP container. FIG. 5e illustrates an isometric view of an erected single piece wrap-around deep style MAP container with two overlapping open lids. The wrap-around deep style MA box in the open form is produced by applying hot melt resin glue at specific contact locations (not shown), first folding the primary end panel 50, then raising folding end flap 48, folding tertiary end panel 51 to form the body at a plurality of fold lines between the various panels. The foldover flaps 52 provide a reverse fold on the tops of the innermost end panels 50 thereby providing a smooth edge with no exposed fluting. The inner of the two lids is sealed either with adhesive tape or hot melt glue to caulk the exposed fluting to produce an airtight seal. After filling the box cavity with produce, the two lids 44 are closed and lapped one over the other and held together with hot-melt resin glue (not shown). This design of the wrap-around style box has the important advantage that it obviates the presence of exposed flute edges in the interior space of the sealed box. In particular, the design calls for ribbons or beads of hot-melt resin glue to be applied along the fold lines of the flaps adjoining one of the side panels and flaps adjoining the base panel.

Upon folding the two side panels 46 upwardly to the perpendicular position (see FIG. 5d), the two primary wrap-around flaps 50 adjoining the unglued front side panels 46 (with no ribbon of hot-melt resin glue) are wrapped around and positioned so that the exposed flute edges are embedded in the ribbons or beads of hot-melt resin glue to bring about flute closure on those panels. Subsequently, the glued base panels 48 are raised and overlapped onto the positioned primary panels 50 and then finally the glued tertiary wrap-around flaps 50 are overlapped onto the positioned secondary end panels 48. This sequence is illustrated in FIGS. 5d and 5e. The flaps 52 are then folded downwardly and glued in place.

A second design variant of the wrap-around (deep) style MA box (see FIGS. 5f and 5g) of the single piece type MA package system consists of a die cut body 141, with a base 142, a full flap lid panel 144 adjoined to a rear panel 146, and a partial flap 148 adjoined to a front panel 150. Four half panel flaps 152 adjoin to the rear panel 140 and front panel 150. Two foldover reversed flaps 156 adjoin the end panels 154 and two full panel side flaps 158 adjoin the lid 144.

FIG. 5g illustrates an isometric view of an erected single piece wrap-around deep style MAP container with overlapping full and partial flap side and lid panels. The wrap-around deep style MA box in the open form is produced by applying hot melt resin glue at specific contact locations (not shown), first raising the end panels 154, then forming the body at a plurality of fold lines between the various panels by overlapping the four half panel flaps 152. The foldover flaps 156 provide a reverse fold in the tops of the half panel flaps 152 thereby providing a smooth edge with no exposed fluting. The partial flap 148 is sealed either with adhesive tape or hot melt glue to caulk the exposed fluting to produce an airtight seal. After filling the box cavity with produce, the side tabs 149 at the ends of foldover flaps 148 are folded down the side panels and glue sealed to flap 156. The full panel lid 144 and full panel side flaps 158 are sealed with hot melt glue.

The design modification of the conventional single-piece wrap-around deep style box is the inclusion of (1) full-width wrap-around end panels rather than one-half width wrap-around end panels, and (2) on both ends, a foldover flap on one of the wrap-around end panels (FIG. 6a). Upon closing the glued full-width wrap-around panels and the folding of the glued foldover flaps onto the surfaces of the outer end panels, an airtight Tamfresh MA package system is created (FIG. 6a).

The design modification of the conventional three piece Bliss box is the inclusion of (1) reversed top folds at the end panels to avoid the cut edge in the side flaps being located inside the box and to provide a smooth top edge suitable for gluing, and (2) the provision of double walled end panels provided with cut outs to ensure gas permeability is controlled by one polymer layer. A further design option (3) can be the application of single 85, double 87, or triple wall 89 corrugated end panels supplied as one component without folds (see FIG. 6h), such panels being caulked with glue 91 or adhesive tape 93 on the top exposed edge. Gas permeability will be controlled by one polymer layer positioned either as the inner liner, outer liner or as a sandwich layer. Micro perforations 95 or slits 97 may also be provided in the plain paper liner walls to facilitate gas exchange (see FIG. 6h). Upon folding the body at the plurality of glued folding lines and the insertion of the end pieces, an open-lid Tamfresh MA package system is created. The face edges of the lids are sealed with tape to cover the flute. When the lids are closed with the folded adjoining flaps glued to the outer surfaces of the side panel, and when the seam between folded lids is sealed with tape, the MA package system is airtight (FIG. 6b).

FIG. 6a illustrates a plan view of the paperboard blanks of a three-piece Bliss style MAP container. FIG. 6aa is an enlarged view of a folded area of FIG. 6a. FIG. 6b illustrates an isometric view of the three components of FIG. 6a folded into an erect three-piece Bliss style MAP container. The three-piece type MA package system (Bliss style MA box) is comprised of a die-cut corrugated paperboard main body 70 with a trilayer complex as inner liner (see FIG. 1), and two separate end pieces 72 and 74 which preferably are corrugated paperboard with a trilayer complex as the inner liner. The main body 70 has areas 71 which are compressed during the cutting and creasing operation to reduce the caliper of the board thereby minimizing the thickness of overlapping glued flaps. The two end panels 72 are folded along fold lines 73. The Bliss style box 70 in the open lid form is constructed by applying two thick ribbons (3 to 12 mm in height) of hot melt resin glue 69 (see FIGS. 6a and 6aa) onto flaps 76, one bead at the flap edge and one bead along the fold lines 66 adjoining the side panels 78 and the base panel 80, by folding the side panels 78 upward to the perpendicular position and by immersing the flute edges of the two end pieces 72 and 74 in the ribbon of hot melt glue at fold line 66. Flaps 76 adjoining the side panels 78 and the base panel 80 are folded against the end pieces 72 and 74 to complete the open box structure. After filling, box closing is accomplished by applying two thick ribbons (3 to 12 mm in height) of hot melt glue 75 onto flaps 76, one bead at the flap edge and one bead along the fold lines 66 adjoining the lids 82. The two lid pieces 82 are then folded over and sealed with hot melt glue at the moment before the flaps overlap. Finally, the remaining flaps 76 adjoining the lids 82 are folded to allow the glue bead to contact the end pieces 72 and 73 thereby completing the box as illustrated in FIG. 6b.

FIG. 6c illustrates an isometric interior cut-away view of a corner joint construction of a Bliss style MAP container. FIG. 6d illustrates a section view taken along section line X—X of FIG. 6b. FIG. 6e illustrates a section view taken along section line p—p of FIG. 6b. FIG. 6f illustrates a section view taken along section line Z—Z of FIG. 6b. FIG. 6g illustrates a section view taken along section line Y—Y of FIG. 6b. The glued locations are identified in solid thick lines 84 in the various figures. The edges of the overlapping lids 84 are sealed with tape 86 to seal the flutes. The glue should be applied in such a manner to overlap the tape edge 86.

The folded, glue-sealed three-piece type MA package system (Bliss style MA box) has the features of specific gas permeabilities, airtightness (no air holes) and stackability. Further, holes may be punched in the end pieces to form air inflow and outflow ports. Such ports may be used to blow cold air through warm produce to reduce the temperature to an appropriate level, and/or blow in a specific MA gas mixture whereupon the ports are covered with high gas-barrier tape or filled with gas-permeable styrofoam plugs for increased influx/efflux of gases, particularly when produce having a high rate of respiration is packed or filled with plastic plugs with small vent holes.

FIGS. 6h, 6i and 6j illustrate respectively side section views of single wall corrugated, double wall corrugated and triple wall corrugated paperboard.

FIG. 7 illustrates an enlarged end view of a section of paperboard with protruding cellulose fibres on the side partially coated with a polymer. FIG. 8 illustrates an enlarged view of a section of paperboard with cellulose fibres on one side completely coated with polymer. A further unique embodiment of this invention as illustrated in FIGS. 7 and 8 is the option to achieve gas porosity by allowing natural pinholes to be produced at the film lamination stage. When a thin polymer film 88 is extrusion coated to one side of the cellulose fibres 89 of the Kraft liner, it is possible for the cellulose paper fibres 89 to penetrate the polymer film layer 88 thereby producing a porous polymer film. The phenomena occurs when the polymer layer is typically less than 15 g/m$^2$ although the precise film calliper and weight at which the polymer covers the fibres is governed by the specific physical characteristics of the particular polymer and the grade of paper finish. It has been found that polymers applied to the smooth side of the Kraft paper will have less pinholes than polymers applied to the rough. This phenomena can be used to select a material with specific porosity characteristics. Furthermore, lower film weights produce a greater number of pinholes, higher film weights are sufficient to cover all the fibres effectively producing a pinhole free polymer layer (see FIGS. 7 and 8). It has also been found that 20 g of polymer coating per given area does not necessarily have the same gas permeability as a 20 g polymeric film over the same area.

A material with natural pinholes becomes porous to the extent that its actual barrier is no longer controlled by the polymer permeability. As the film weight increases to the point where no natural pinholes are present, the barrier is then determined by the permeability of the polymer 88.

FIG. 9 illustrates an end section view of a corner construction of a MAP container sealed at two locations with hot melt glue. FIG. 10 illustrates an end section view of a corner construction of a MAP container sealed at two locations with foamed glue. FIG. 11 illustrates a partial isometric view of the edge of a trilayer corrugated paperboard sealed with hot melt glue and double tape. FIG. 12 illustrates a section view taken along section line X—X of FIG. 11.

A factor crucial to the barrier/permeability characteristics of the box is the integrity of the glue seals. An air tight seal must be produced otherwise gas exchange will undesirably occur through seal defects rather than desirably by permeability through the polymer lining or controlled pinholes. As seen in FIG. 9, which illustrates an end section view of a corner construction of a MAP container sealed with hot melt glue, an hermetic glue seal is produced when sufficient hot melt glue is applied to form a fillet 90 at mating surfaces thereby sealing the exposed fluting 91.

The glue composition may be either a conventional hot melt resin glue (FIG. 9), cold set water resistant glue, typically starch or dextrin formulations, or a foaming type hot melt (see FIG. 10). A foaming glue as seen in FIG. 10 has been found to be very effective in producing an hermetic seal because of its ability to expand following application and penetrate into and fill up any voids, such as the exposed edges of fluted paperboard.

FIG. 11 illustrates a partial isometric view of a trilayer corrugated cardboard sealed with glue and double tape. FIG. 12 illustrates a section view taken along section line X—X of FIG. 11 with the addition of the glued lid. In certain commercial applications, it may be appropriate to use a box or tray design which leaves exposed fluting (93) on an inside flap (as shown in FIG. 11). To prevent premature and rapid change in the gas composition inside the box 92, it has been found advantageous to seal off the fluting 93 by applying two self adhesive film tapes 94 and 96 (see section view in FIG. 12) to both the inside 98 and outside liners 100 in such a manner that the two film strips 94 and 96 seal to each other thereby blanking off the fluting 90. Alternatively, a bead of glue 99 can be applied to seal the fluting (see FIG. 6h).

The tape is applied to the inner flap before it is folded to the closed position. The outer flap 92 is then sealed by hot melt glue 102 to the outside face 100 of the inner flap 98. The combination of tape and glue produce an hermetic closure.

FIG. 13 illustrates an isometric view of a MAP container with the top lid flap sealed with tape prior to closing. FIG. 14 illustrates an isometric view of a MAP container with glue applied to the top flap prior to closing. FIG. 15 illustrates an isometric sequential view of a MAP container as it proceeds through a tape, glue, tape, glue and compression procedure.

FIG. 16 illustrates an isometric view of a MAP container being punctured with a MAP gas injector nozzle. FIG. 17 illustrates a side section view of a MAP gas injector nozzle penetrating a trilayer container wall. FIG. 18 illustrates a side section view of MAP gas injector nozzle withdrawn from a trilayer wall and the injector hole being sealed by a glue jet. FIG. 19 illustrates a side section view of an injector hole in a trilayer paperboard sealed with a plug.

A further embodiment of the invention is the principle of taking the hermetically sealed box and injecting a gas mixture into the said box to modify the atmosphere (see FIG. 16). The technique involves piercing the box 102 with a gas injection nozzle 104 and purging the internal gases in the box with a prescribed mixture of oxygen and carbon dioxide. The composition of gases is selected to suit individual fresh fruit and vegetable products and their respective levels of respiration. The invention also covers product applications where no gas purge is necessary (passive MAP) and the atmosphere modification is achieved by natural respiration.

By controlling the injection time and gas pressure, the required headspace gas composition is achieved. When the required gas composition is achieved inside the box, the injection nozzle 104 is retracted from the box 102 leaving a hole 106 which is sealed by a spot of hot melt glue 108 from a glue jet 110 or rigid plug 112 (see FIGS. 17, 18 and 19). When sealing with glue, the hole size must be sufficient to allow the glue to run into the hole by gravity and capillary action thereby producing a plug which creates an hermetic seal. It is important that the glue penetrates to the inner liner otherwise gas would escape through the fluting. Similarly, if a rigid plug 110 as shown in FIG. 19 is employed, it must also seal the hole completely.

Description of the Physical and Process Characteristics

Storage life of fresh fruits and vegetables is dependent on storage temperature, gas composition around the produce and degree of physical abuse leading to bruises, abrasions and cuts. Storage and transportation of fruits and vegetables is facilitated by the packing of the produce in suitable package systems which provide features such as prolonging storage life, reducing physical abuse and lowering the rate of water loss of produce.

Corrugated paperboard boxes and cartons are used commercially for the storage and transportation of fresh fruits and vegetables for the following reasons:
1. Relatively low cost per unit volume;
2. Low thermal conductivity;
3. Impact absorbing ability to prevent produce bruising;
4. Ease of disposal at the receiving end; and
5. Moderate stacking strength.

Since corrugated paperboard has very high $O_2$ and $CO_2$ permeabilities, this material by itself would be unsuitable for the construction of MA package systems. By incorporating a plastic, gas-permeable membrane into the corrugated paperboard structure, suitable MA package systems with specific gas and moisture permeabilities can be constructed.

To achieve the desired performance characteristic in the corrugated cellulose fibre paperboard, it has been found necessary to produce the corrugated paperboard in two stages by gluing the external paper wall 10 to the exterior of the flute 8 rather than the inner wall. (FIG. 1) The trilayer liner comprising film 2, and paper layers 4 and 6 is then glued as the second inner wall to make up the final double faced paperboard. By employing this reversed procedure, the barrier polymer is not subjected to the high temperature and pressure encountered during the single face operation. It has been found that high temperature and pressure at the nip point between the corrugating roll and pressure roll can cause a breakdown of the polymer leading to thinning and pinholing. By gluing the barrier liner as the second wall, it is possible to use lower temperature and pressure thereby preventing polymer degradation.

The trilayer liner with the polymeric plastic film membrane 2 as the middle layer will prevent water movement from the inside cavity, filled with a fruit or vegetable, to the fluting 8 and outer lining 10 of the corrugated paperboard with the benefit of the retention of the original wall strength. A gas-permeable, flexible polymeric plastic film with specific gas and moisture permeabilities is suitable for placement between two sheets 4 and 6 of Kraft paper to form a trilayer complex with specific $O_2$ and $CO_2$ and moisture permeabilities. The trilayer liner may be manufactured by any of the following production methods:

Extrusion Lamination

This is a process whereby a molten polymer is extruded through a slit die and applied as a laminant to combine the two Kraft paper substrates. By employing extrusion lamination, it is possible to produce very thin calliper films thereby producing a material with high permeability characteristics. Such thin polymer films would not be practical if produced as separate film liners or bag-in-box. By laminating to Kraft paper, physical support is provided to protect the thin polymer film.

Extrusion Coating

This is a process whereby a molten polymer film is extruded through a slit die onto one Kraft paper substrate and in a second operation, adhesive lamination is employed to combine the second Kraft liner.

Adhesive Lamination

This is a process whereby a premade polymer film, produced by slit die extrusion or annular die film blowing, is adhesive laminated to the two Kraft substrates, either simultaneously or in sequence.

The gas permeable polymeric layer can be homopolymers or copolymers produced as a monolayer or coextruded layers with specific formulation and calliper selected to produce the required oxygen ($O_2$) and carbon dioxide ($CO_2$) permeabilities. Polymers would likely be selected from the polyolefin family, typically Low Density Polyethylene (LDPE), linear low density polyethylene (LLDPE), medium and high density polyethylene (MDPE and HDPE), polypropylene (PP). Additional polymers such as ethylenevinylacetate (EVA), ethyl butyl acetate (EBA), ionomer resins (cross-linked), cast polyester (PET), nylon (polyamide) and polycarbonate (PC) may also be considered.

Coextrusions combining low density polyethylene with ethylenevinylacetate or ethylbutylacetate have been found to be particularly effective in lowering gas barrier to produce a highly permeable film. Percentages of ethylenevinylacetate or ethylbutylacetate are at the range of 5% to 30%.

A further unique embodiment of this invention is the ability of the box to maintain its internal equilibrium volume under varying gas compositions in the headspace. The gas permeability of the box prevents a vacuum condition developing which can occur in conventional MAP systems if the package produce starts to absorb carbon dioxide. If such conditions were to develop in the permeable box, the controlled influx of gases through the gas permeable film would not allow a vacuum to develop.

For specific product applications, the rate of gas exchange within the box may be achieved by a combination of polymer barrier and controlled film porosity. Porosity may also be achieved by piercing holes through the polymer containing inner liner either at the corrugating stage, die cutting operation, box forming stage, or in the completed box. Hole size, either single or multiple, may vary depending on the required gas exchange rate but typical diameter would be in the range of 0.25 to 2.00 mm. Hole positions on the box will vary depending on the optimum location for each product and the gas flow dynamics within the box.

It has been established that oxygen ($O_2$) and carbon dioxide ($CO_2$) gas exchange rates through the trilayer corrugated paperboard of the invention fall within the range 50–50,000 $cc^3/m^2.24$ hr. 1 atm.

It has also been found that the following additional factors must be critically controlled if consistent polymer characteristics are to be achieved:

Process conditions

Extrusion rate, melt temperature, melt pressure, nip pressure, nip position, chill roll temperature, corrugating process conditions, corrugated board die cutting conditions.

Polymer characteristics

Melt flow index, additives (processing aids).

Paper characteristics

Fibre length, virgin or recycled pulp, smooth or rough side, with or without calender process.

In this invention, the plastic film membrane 2 is sandwiched between two sheets 4 and 6 of Kraft paper to form a trilayer complex as the inner liner of a corrugated paperboard MA package system. The film membrane 2 may be a gas-permeable plastic film or a plastic coating applied to one of the sheets of Kraft paper, and then sealed between the two sheets. The membrane is bonded to both of the Kraft paper sheets when the plastic is in semi-molten state and the two paper sheets are pressed together.

When 25 g/m² low density polyethylene was used, extrusion laminated on 40 g/m² and 125 g/m² MG Kraft, the $O_2$ and $CO_2$ permeability were 1300 and 2200 cc/m².24 hr. 1 atm. respectively. When a 35 g/m² coating of 17% EBA and LDPE was extrusion laminated, the $O_2$ and $CO_2$ permeability were 2300 and 4700 cc/m².24 hr. 1 atm. respectively.

In certain applications, it may be possible to seal the fluting by the application of hot melt glue as an alternative to self adhesive tape.

The diagrams illustrate, as an example, the Bliss style box but the principle of taping and gluing to produce an hermetic seal may be applied to any style of box or tray which has an exposed board edge.

Many studies have been carried out on the MAP of fruits and vegetables with sealed polymeric, plastic film bags in a corrugated paperboard box (Prince, 1989). However, several disadvantages of using a bag-in-box are evident:
1. Loss of headspace around produce with the shrinkage of the bag under negative pressure created by respiratory $CO_2$ dissolution in produce tissue;
2. Extra handling of two packages, namely, the bag and the box;
3. The thickness of the bag film must be at least 6 mil to ensure bag durability during the handling, and thus high package cost and low gas permeability of the bag is unavoidable.

If a corrugated MA package system with a polymeric plastic membrane-containing trilayer Kraft paper complex as the inner liner were used for prolonging the storage life of fruits and vegetables, the above-mentioned disadvantages would not be applicable.

The single-piece and three-piece types of MA package systems are to be constructed in such a manner that upon gluing, folding and pressing at glue points, the following requirements are met:
1. The inside surface of the package systems are smooth with no paper board projections.
2. The package systems must be resistant to stacking-pressure collapse.
3. The MA package systems are airtight, yet the walls have specific $O_2$ and $CO_2$ permeabilities.

The single-piece type MA package system is intended to be used on a continuous-flow or a batch-type operation consisting of:
1. A gluing, folding and pressing operation to create an open box;
2. The filling of the open box with produce;
3. Gluing, closing and sealing of box lid and flaps;
4. Gasification of produce headspace.

The single-piece type MA package system may have gas inlet and gas outlet apertures in the two end panels for gasification of the produce headspace in a completely closed MA package system (including glued, sealed flaps).

A further benefit of injecting gas into an hermetically sealed box is that it is possible to include a trace gas, typically helium or sulphurhexafluoride as a leak detection method. Provided the box is relying on gas permeability and not porosity, it is possible to sense gas escape through cracks, unwanted pinholes or faulty glue seals.

Upon the insertion of a gas nozzle into the inlet aperture and upon the flow of the pressurized gas mixture through the headspace of the package system, plugs with vent pinholes or styrofoam plugs would be used for produce with high respiration rates and gas-impermeable plastic plugs may be used for low respiration rate produce.

Also, the two-piece type MA package system is intended to be used on a continuous-flow or a batch-type operation consisting of:
1. A gluing, folding and pressing operation to create an open box;
2. The filling of the open box with produce;
3. Gluing;
4. Gasification of produce headspace.

The three-piece type package system may have gas inlet and gas outlet apertures in the two end panels for gasification of the produce headspace in a completely closed MA package system. Upon the insertion of a gas nozzle into the inlet aperture and upon the flow of a pressurized gas mixture through the headspace of the package system, plugs with vent pinholes or styrofoam plugs are to be inserted. Styrofoam plugs would be used for produce with high respiration rate produce, and gas-impermeable plastic plugs or gas-impermeable tape may be used for low respiration rate produce.

The selection of either the single-piece type or the three-piece type will depend upon:
1. Unit cost with respect to the amount of waste paperboard in the die-cutting operation and the number of die-cutting operations per unit package system;
2. The complexity of the closing operation;
3. Adaptability to the gasification operation;
4. Strength of the closed package system (resistance to stack compression); and
5. Ease of handling, stacking and palletizing.

EXAMPLE 1

Determination of Permeability of Barrier Materials Manufactured with Different Kinds and Amounts of Polymers In the applicant's research, barrier materials were manufactured according to the following procedures:

1. Material Descriptions

The trilayer samples were constructed using 40 g/m² MG Kraft+Polymer+125 g/m² MG Kraft liner. Two kinds of Kraft paper were used: 125 g/m² and 40 g/m². The smoothness (roughness) measurements of both sides were as follows:

| Kraft paper | Inside | Outside |
| --- | --- | --- |
| 125 g/m² | 600 (bendtsen) | 1,000 (bendtsen) |
| 40 g/m² | 125 (bendtsen) | 420 (bendtsen) |

Three polymer materials, low density polyethylene (LDPE), and high density polyethylene (HDPE), a copolymer of LDPE and ethylene butyl acetate (EBA) at 10 g, 15 g, 25 g, 35 g and 45 g per square meter were used.

2. Process Conditions

At fixed process conditions, extrusion polymer melting temperature was 315° C. and the air gap (or nip height) was 200 mm.

Using the smooth or rough side of the Kraft paper, the relative permeabilities and pinhole numbers on the flat sheet, or the folding lines are tabulated below in Table 1.

TABLE 1

Relative Permeability Obtained from Barrier Materials Manufactured by Various Polymers and Conditons

| Material | Coating Side | Coating Polymer Weight (g/m²) | Relative Permeability O₂ | Relative Permeability CO₂ | Pinhole Numbers Flat Liner/m² | Folding Line Width/m | Folding Line Length/m |
| --- | --- | --- | --- | --- | --- | --- | --- |
| LDPE | Smooth | 10 | 3.58 | 3.46 | 225 | 79 | 33 |
| | | 15 | 1.70 | 1.68 | 38 | 2 | 2 |
| | | 25 | 1.04 | 1.08 | 13 | 1 | 0 |
| | | 35 | 1.03 | 1.06 | 0 | 0 | 0 |
| | | 45 | 1 | 1 | 0 | 0 | 0 |
| LDPE | Rough | 10 | 4.80 | 4.64 | TNTC | 84 | 77 |
| | | 15 | 1.83 | 1.76 | 1,312 | 10 | 21 |
| | | 25 | 0.90 | 0.89 | 0 | 1 | 0 |
| | | 35 | 0.99 | 1.02 | 0 | 0 | 0 |
| | | 45 | 0.94 | 0.95 | 0 | 0 | 0 |
| LDPE & EBA | Smooth | 10 | 17.26 | 16.52 | 2,800 | 125 | 111 |
| | | 15 | 6.21 | 6.06 | 600 | 57 | 32 |
| | | 25 | 2.76 | 2.70 | 0 | 0 | 0 |
| | | 35 | 1.99 | 1.95 | 0 | 0 | 0 |
| | | 45 | 1.89 | 1.87 | 0 | 0 | 0 |
| HDPE | Smooth | 10 | 3.23 | 3.11 | 100 | 70 | 29 |
| | | 15 | 1.17 | 1.13 | 30 | 13 | 3 |
| | | 25 | 0.74 | 0.77 | 0 | 0 | 0 |
| | | 35 | 0.63 | 0.66 | 0 | 0 | 0 |
| | | 45 | 0.60 | 0.61 | 0 | 0 | 0 |

A number of conclusions can be drawn from the results in Table 1:

1. The higher gas permeability of 10 g/m² and 15 g/m² materials was due to pinholes in the polymer layer formed during the manufacturing process.
2. The relationship of thickness of the polymer layer and the gas permeability of that material do not necessarily follow the general principle of polymer film, ie. that the gas permeability of the film is inversely proportional to the thickness.

At the coating polymer weight between 20 g–45 g/m², the gas permeability is mainly governed by the polymer type and the process conditions, but is less affected by the amount of polymer used.

3. When the smooth side of MG paper was used for polymer coating, the gas permeability was more consistent, and less pinholes were formed.

EXAMPLE 2

Gas Permeability of Barrier Materials Manufactured at Different Processing Conditions When extrusion lamination process conditions were changed, but the kinds and amounts of polymer and Kraft liner stayed the same (as in Example 1) it was found that the gas permeability of the barrier materials manufactured under various process conditions were tabulated in Table 2.

TABLE 2

Relative Gas Permeability of Barrier Material Manufactured Under Various Process Conditions (Using 25 g/m² LDPE at 315° C. as Standard

| Polymer Material and Weight | Extrusion Temperature °C. | Nip Height (mm) | Relative Permeability O₂ | Relative Permeability CO₂ |
| --- | --- | --- | --- | --- |
| LPDE 25 g/m² | 285 | 280 | 1.15 | 1.12 |
| | 285 | 180 | 1.25 | 1.24 |
| | 315 | 200 | 1 | 1 |
| | 330 | 280 | 0.70 | 0.71 |
| | 330 | 180 | 0.81 | 0.80 |

The above results lead to the following conclusions:
1. Melting (extrusion) temperature has a greater effect on the barrier property than the air gap (nip height).
2. Consistent gas permeability can only be obtained under strictly controlled processing conditions.

EXAMPLE 3

Although by using different polymers and process conditions, barrier materials of various permeabilities can be achieved, for very high respiring produce, high permeability materials need to be developed. In order to precisely control the permeability to match the need of certain specific produce, and box configurations (volume/surface area ratio), the permeability of a barrier material can be achieved by making controlled pinholes.

For specific product applications, the rate of gas exchange within the box may be achieved by a combination of polymer barrier and Controlled film porosity. Porosity may be achieved by piercing holes through the polymer containing inner liner either at the corrugating stage, die cutting operation, or box forming stage. Hole size, either single or multiple, may vary depending on the required gas exchange rate but typically would be in the range of 0.25 to 2.00 mm diameter. Hole positions on the box will vary depending on the optimum location for each product and the gas flow dynamics within the box.

The pinhole size and pinhole numbers will affect the resulting final gas permeability. Table 3 below gives examples of using different sizes of pinholes to achieve same open areas and relative permeabilities.

TABLE 3

Relative Gas Permeabilities Obtained by Same Porous Area Created by Different Pinhole Sizes and Pinhole Numbers

| Pinhole Size (mm) | Pinhole Number | Relative Permeability ($cc/m^2$, 24 hr. atm.) | |
|---|---|---|---|
| | | $O_2$ | $CO_2$ |
| 0.3 | 25 | 1 | 1 |
| 0.6 | 6 | 1.35 | 1.40 |
| 1.1 | 2 | 1.90 | 1.77 |
| 1.5 | 1 | 0.60 | 0.59 |
| 0.3 | 50 | 1.47 | 1.47 |
| 0.6 | 12 | 2.00 | 2.08 |
| 1.1 | 4 | 2.68 | 2.55 |
| 1.5 | 2 | 2.60 | 2.73 |

EXAMPLE 4

A box (dimension 56×39×19 cm) made of corrugated paperboard and trilayer barrier liner G was filled with 20–21 lb. fresh broccoli crowns. The permeability of this MAP package was found to be very close to the broccoli produce's need but not exactly right. Therefore the controlled pinhole method was used to improve the gas permeability packaging condition. The gas composition in the headspace and the quality of the broccoli product are presented in the following table.

TABLE 4

| Storage Time (2° C.) | Corrugated Box with Liner G | | | Corrugated Box with Liner G + 8 mm Pinholes | | |
|---|---|---|---|---|---|---|
| | $O_2$ | $CO_2$ | Product Quality | $O_2$ | $CO_2$ | Product Quality |
| 1 | 11.40 | 6.34 | very good | 15.46 | 5.76 | very good |
| 2 | 4.90 | 11.53 | very good | 13.36 | 6.73 | very good |
| 3 | 1.00 | 15.06 | very slightly off odor | 11.88 | 9.27 | very good |
| 4 | 1.22 | 17.39 | moderate off odor | 11.21 | 10.00 | very good |
| 7 | 1.22 | 17.75 | moderate strong off odor | 11.66 | 9.82 | very good |
| 8 | 0.47 | 21.71 | strong off odor | 11.58 | 9.87 | very good |

AS will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

We claim:

1. A corrugated gas-permeable paperboard combination comprising:

(a) a first layer of kraft paper;

(b) a layer of polymer with no natural pinholes therein;

(c) a second layer of kraft paper, said first and second layers of kraft paper sandwiching the first layer of polymer between them;

(d) a corrugated fluting affixed to a side of the second kraft paper layer, on a side of the second kraft paper layer opposite the polymer layer; and (e) a third layer of kraft paper affixed to the corrugated fluting, on a side of the corrugated fluting opposite the second layer of kraft paper, wherein at least one of the layers of the paperboard combination is punctured with at least one pinhole to permit gas to be transmitted through the paperboard combination at prescribed levels.

2. A paperboard as claimed in claim 1 wherein the gas permeability of the polymer is between about 50 and 50,000 $cc^3/m^2$.24 hr. 1 atm.

3. A paperboard as claimed in claim 1 wherein the first layer of Kraft paper, the layer of polymer and the second layer of Kraft paper are formed together before the fluting and third layer of Kraft paper are joined together, to form the paperboard.

4. A paperboard as claimed in claim 1 wherein the layer of polymer is extruded on one side of the first layer of Kraft paper and then affixed to the second layer of Kraft paper, and the layer of polymer and the second layer of Kraft paper are affixed to the corrugated fluting.

5. A paperboard as claimed in claim 1 wherein the layer of polymer is preformed and is then laminated between the first layer of Kraft paper and the second layer of Kraft paper, and the first layer of Kraft paper the layer of polymer and the second layer of Kraft paper are affixed to the corrugated fluting.

6. A paperboard as claimed in claim 1 wherein the layer of polymer is low density polyethylene.

7. A paperboard as claimed in claim 1 wherein the layer of polymer is high density polyethylene.

8. A paperboard as claimed in claim 1 wherein the layer of polymer is a copolymer of low density polyethylene and ethylenebutylacetate.

9. A paperboard as claimed in claim 1 wherein the overall permeability of the paperboard combination is regulated in part by regulating the thickness of the polymer and the processing conditions in forming the paperboard combination so that no natural pinholes are formed.

10. A paperboard as claimed in claim 1 wherein the overall permeability of the paperboard combination is regulated in part by regulating the the composition of the polymer layer and the type of kraft paper.

11. A paperboard as claimed in claim 1 wherein the polymer is selected from the group consisting of ethylene vinylacetate (EVA), ethylbutyl acetate (EBA), a crosslinked ionomer resin, cast polyester (PET), a polyamide and polycarbonate (PC).

12. A corrugated paperboard as claimed in claim 1 wherein the paperboard has double parallel fluting separated by a layer of Kraft paper.

13. A corrugated paperboard as claimed in claim 1 wherein the polymer layer is associated with the fluting.

14. A corrugated paperboard as claimed in claim 1 wherein the polymer layer is adjoined to the third layer.

15. A paperboard combination as claimed in claim 1 wherein the at least one pinhole penetrates at least two layers of the corrugated paperboard.

16. A paperboard combination as claimed in claim 1 wherein the at least one pinhole penetrates the layer of polymer.

17. A corrugated paperboard modified atmosphere package container suitable for packaging fruits and vegetables under refrigerated modified atmosphere conditions comprising:

(a) a container constructed of an erected corrugated paperboard blank having flaps, side panels, end panels, base panels and lid panels formed therein and fold and joint lines impressed therein, said corrugated paperboard blank being constructed of:

(i) a first layer of Kraft paper;

(ii) a layer of polymer having a gas permeability which permits gas to be transmitted in either direction through the polymer at prescribed levels;

(iii) a second layer of Kraft paper, said first and second layers of Kraft paper sandwiching the polymer between them;

(iv) a corrugated fluting affixed to a side of the second Kraft paper layer, opposite the polymer and the first layer of Kraft paper;

(v) a third layer of Kraft paper affixed to the corrugated fluting layer, on a side of the fluting opposite the second layer of Kraft paper; and (b) glue applied to intersecting joints, flaps, side panels, end panels, and lid panels to provide a hermetic seal to the erected container, said container having a required overall permeability which permits gas to be transmitted into or out of the container.

18. A container as, claimed in claim 17 wherein the glue is hot melt glue which is applied to cover exposed and intersecting edges of the joints, flaps, side panels, end panels and lid panels.

19. A container as claimed in claim 17 wherein the glue is a foamed glue which is applied to cover exposed and intersecting edges of the joints, flaps, side panels, end panels and lid panels.

20. A container as claimed in claim 17 wherein the glue is cold set water resistant glue which is applied to cover exposed and intersecting edges of the joints, flaps, side panels, end panels and lid panels.

21. A container as claimed in claim 17 wherein at least one porthole is punched in an end panel of the container, and subsequently sealed with a plug.

22. A container as claimed in claim 17 wherein at least one porthole is punched in an end panel of the container, and subsequently sealed with tape.

23. A container as claimed in claim 17 wherein at least some edges of the joints, flaps and panels are sealed with tape.

24. A container as claimed in claim 17 wherein at least some of the joints, flaps and panels are sealed with glue and tape.

25. A container as claimed in claim 17 wherein a first side of the first layer of Kraft paper, opposite the side adjacent the polymer layer, is coated with a polymeric coating.

26. A container as claimed in claim 17 wherein edges of flaps intersecting with sides of the container are sealed with glue, and the flaps are bent around the corners of the glued edges, and are glued at a second location.

27. A container as claimed in claim 26 wherein the layer of polymer is at least partially permeable to oxygen and carbon dioxide.

28. A container as claimed in claim 17 wherein exposed edges of flaps and sides are folded, and the exposed edges of the corrugated paperboard are sealed with glue.

29. A container as claimed in claim 28 wherein glue is applied at a second location to exposed edges of paperboard.

30. A container as claimed in claim 17 wherein after the container is erected, and sealed, the interior of the container is filled with a modified gas atmosphere which is injected into the interior of the container by a gas injection nozzle which penetrates a wall of the container.

31. A container as claimed in claim 30 wherein a puncture is formed in the wall of the container by the gas injection nozzle and the puncture is sealed with glue, after extraction of the nozzle.

32. A container as claimed in claim 30 wherein a puncture is formed in the wall of the container by the gas injection nozzle and the puncture is sealed with a plug, after extraction of the nozzle.

33. A container as claimed in claim 17 wherein the layer of polymer is selected so that the container has a gas permeability which is within a predetermined gas transmission range which is selected in accordance with the respiration rate and characteristics of produce to be packaged in the container.

34. A container as claimed in claim 17 wherein at least one of the layers of the container is punctured with at least one pinhole to regulate gas transmission rates through container walls.

35. A container as claimed in claim 34 wherein the pinhole penetrates at least two layers of the corrugated paperboard.

36. A container as claimed in claim 17 wherein at least one pinhole penetrates the layer of polymer.

37. A container as claimed in claim 17 wherein the layer of polymer is flexible and has selected gas and moisture permeabilities.

38. A paperboard as claimed in claim 17 wherein the gas permeability of the polymer is between about 50 and 50,000 $cc^3/m^2 \cdot 24$ hr. 1 atm.

39. A container as claimed in claim 17 wherein the container is filled with produce, a modified atmosphere is injected into the container, and the container is held at a temperature between about 1° C. to 12° C.

40. A corrugated paperboard modified atmosphere package container suitable for packaging fruits, vegetables and cut flowers under refrigerated modified atmosphere conditions comprising:

(a) a container constructed of an erected corrugated paperboard blank having joints, flaps, side panels, end panels, base panels and lid panels formed therein and fold and joint lines impressed therein, said corrugated paperboard blank being constructed of:

(i) a first layer of Kraft paper;

(ii) a layer of polymer having a gas permeability which permits gas to be transmitted in either direction through the polymer at prescribed levels;

(iii) a second layer of Kraft paper;

(iv) a corrugated fluting;

(v) a third layer of Kraft paper; and (b) glue applied to intersecting joints, flaps, side panels, end panels, base panels and lid panels to provide a hermetic seal to the erected container, (c) at least some of the flaps being adjoined to the side panels, end panels, base panels and lid panels at edges which without said flaps would expose edges of fluting to the interior of the container, the flaps being folded to the exterior of the container so as to present solid edges at all interior edges in the container, said container having a required overall permeability which permits gas to be transmitted into or out of the container.

41. A container as claimed in claim 40 wherein the glue is hot melt glue which is applied to cover exposed and intersecting edges of the joints, flaps, side panels, end panels and lid panels.

42. A container as claimed in claim 40 wherein the glue is a foamed glue which is applied to cover exposed and intersecting edges of the joints, flaps, side panels, end panels and lid panels.

43. A container as claimed in claim 40 wherein the glue is cold set water resistant glue which is applied to cover exposed and intersecting edges of the joints, flaps, side panels, end panels and lid panels.

44. A container as claimed in claim 40 wherein edges of flaps intersecting with internal sides and ends of the container are sealed with glue, and the flaps are bent around the corners of the glued edges, and are glued at a second location.

45. A container as claimed in claim 40 wherein interior exposed edges of flaps and sides are folded, and the exposed edges of the corrugated paperboard are sealed with glue.

46. A container as claimed in claim 45 wherein glue is applied at a second location to exposed edges of paperboard.

* * * * *